(12) United States Patent
Matsuzaki

(10) Patent No.: US 8,437,227 B2
(45) Date of Patent: May 7, 2013

(54) ELECTRONIC TIMEPIECE

(75) Inventor: Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/427,056

(22) Filed: Mar. 22, 2012

(65) Prior Publication Data

US 2012/0176868 A1    Jul. 12, 2012

Related U.S. Application Data

(63) Continuation of application No. 12/552,669, filed on Sep. 2, 2009, now Pat. No. 8,169,857.

(30) Foreign Application Priority Data

Sep. 4, 2008    (JP) .................................. 2008-227059

(51) Int. Cl.
- G04C 11/02    (2006.01)
- G01S 19/28    (2010.01)
- G01S 19/25    (2010.01)

(52) U.S. Cl.
USPC .................... 368/47; 342/357.67; 342/357.64

(58) Field of Classification Search .................... 368/47; 342/357.67, 357.72, 357.74
See application file for complete search history.

(56) References Cited

U.S. PATENT DOCUMENTS

| | | | | |
|---|---|---|---|---|
| 5,408,444 A * | 4/1995 | Kita et al. | ........................ | 368/47 |
| 6,212,133 B1 * | 4/2001 | McCoy et al. | .................... | 368/9 |
| 6,563,765 B1 * | 5/2003 | Ishigaki | ............................ | 368/47 |
| 7,457,203 B2 * | 11/2008 | Nakagawa | ...................... | 368/47 |
| 7,812,763 B2 | 10/2010 | Baba et al. | | |
| 7,852,711 B1 * | 12/2010 | Fitzgerald et al. | .............. | 368/21 |
| 8,188,916 B2 | 5/2012 | Shingyoji | | |
| 2006/0214847 A1 | 9/2006 | McBurney et al. | | |
| 2007/0210957 A1 | 9/2007 | Brodie et al. | | |
| 2007/0230285 A1 * | 10/2007 | Nakagawa | ...................... | 368/47 |
| 2008/0074950 A1 * | 3/2008 | Rostrom | ........................ | 368/10 |
| 2008/0175105 A1 * | 7/2008 | Urano et al. | .................... | 368/47 |

(Continued)

FOREIGN PATENT DOCUMENTS

| | | |
|---|---|---|
| JP | 2003-344523 A | 12/2003 |
| JP | 2005-283236 A | 10/2005 |
| JP | 2009-139128 A | 6/2009 |

OTHER PUBLICATIONS

European Search Report, application No. 09011325.9, dated Feb. 1, 2011.

(Continued)

*Primary Examiner* — Vit W Miska

(57) ABSTRACT

An electronic timepiece that receives satellite signals transmitted from positioning information satellites includes: a satellite signal reception unit that receives satellite signal(s); a satellite capturing unit that executes a process of capturing at least one of the satellites within a capture time based on the satellite signal(s) received by the reception unit; a time adjustment information generating unit that acquires satellite information from the satellite signal(s) transmitted from the captured satellite(s), and generates time adjustment information based on the satellite information; a time information adjustment unit that adjusts internal time information based on the time adjustment information; and a time information display unit that displays the internal time information. The capture time is from the start of reception of the satellite signal(s) to capture of at least one satellite, and if no satellite is captured within this time period, the satellite capturing unit stops reception of the satellite signal(s).

7 Claims, 19 Drawing Sheets

U.S. PATENT DOCUMENTS

2009/0015470 A1   1/2009   Fujisawa
2009/0016167 A1   1/2009   Matsuzaki
2009/0034371 A1   2/2009   Matsuzaki
2009/0034372 A1   2/2009   Fujisawa
2012/0051191 A1 * 3/2012   Fujisawa .................. 368/47

OTHER PUBLICATIONS

European Office Action, application No. 09011325.9, dated Sep. 26, 2011.

* cited by examiner

ELECTRONIC TIMEPIECE

CONTINUING APPLICATION DATA

This application is a continuation of, and claims priority under 35 U.S.C. §120 on, U.S. application Ser. No. 12/552,669, filed on Sep. 2, 2009, which application claims priority under 35 U.S.C. §119 on Japanese Patent Application No. 2008-227059, filed on Sep. 4, 2008. The content of each such related application is incorporated by reference herein in its entirety.

BACKGROUND

1. Field of Invention

The present invention relates to an electronic timepiece that adjusts the time based on signals received from positioning information satellites such as GPS satellites.

2. Description of Related Art

The Global Positioning System (GPS) in which satellites (GPS satellites) orbiting the Earth on known orbits transmit signals carrying superposed time information and orbit information, and terrestrial receivers (GPS receivers) receive these signals to determine the location of the receiver, is widely known. The GPS receiver captures signals from a plurality of GPS satellites, acquires satellite information including accurate time information (GPS time information) and orbit information from each of the captured satellites, performs a positioning (navigation) calculation using the acquired satellite information, and thereby acquires its own location. The time required to acquire the satellite information therefore depends upon the strength of the satellite signal, and the positioning calculation can take a long time to conclude.

Japanese Unexamined Patent Appl. Pub. JP-A-2003-344523 teaches a GPS receiver that stores previously acquired satellite information and positioning information in backup memory, and has a hot start mode and a cold start mode. The hot start mode uses the information stored in backup memory to predict the GPS satellites that currently can be acquired, and shortens the time required from startup to determining the position by attempting to capture those satellites. The cold start mode attempts to sequentially capture all GPS satellites in the constellation. When this GPS receiver starts in the cold start mode, the timeout time is set longer than when the receiver starts in the hot start mode to improve the probability that the positioning calculation converges.

Electronic timepieces that acquire accurate time information and orbit information from a GPS satellite and adjust the current time kept by the timepiece to the accurate local time have also been developed as a type of GPS receiver. However, a problem with battery-powered timepieces such as a wristwatch is that battery power can drop sharply if a long time is required for the positioning calculation, causing the system to shutdown. Therefore, a problem that is presented particularly by battery-powered timepieces is optimizing power consumption by setting the timeout period of the positioning calculation according to the reception conditions. Because the method taught in JP-A-2003-344523 sets a longer timeout period in the cold start mode, the positioning calculation can take a long time in the cold start mode if the signal strength is weak.

SUMMARY OF INVENTION

An electronic timepiece, e.g., an electronic watch, according to the present invention adjusts the time based on a satellite signal sent from a positioning information satellite while optimizing power consumption according to the reception conditions.

A first aspect of the invention is an electronic timepiece having a function for receiving satellite signals transmitted from positioning information satellites, including: a satellite signal reception unit that receives satellite signal(s); a satellite capturing unit that executes a process of capturing at least one of the positioning information satellites within a capture time based on the satellite signal(s) received by the satellite signal reception unit, the capture time being a time period starting from reception of the satellite signal(s) to capture of at least one of the positioning information satellites; a time adjustment information generating unit that acquires satellite information from the satellite signal(s) transmitted from one or more of the positioning information satellites captured by the satellite capturing unit, and generates time adjustment information based on the satellite information; a time information adjustment unit that adjusts internal time information based on the time adjustment information; and a time information display unit that displays the internal time information. The satellite capturing unit is configured to stop reception of the satellite signal(s) if none of the positioning information satellites is captured within the capture time.

The satellite information is time information kept by the positioning information satellite or orbit information for the positioning information satellite, for example.

The internal time information is information about the time that is kept internally by the electronic timepiece.

The time adjustment information is any information required to correct the internal time information, including, for example, the time information of the positioning information satellite acquired from the satellite signal, and time information calculated that is based on the acquired time information of the positioning information satellite (such as the time difference between the time of the positioning information satellite and the internal time of the electronic timepiece). The time adjustment information may also be information about the time difference related to the position information calculated from the orbit information for a plurality of positioning information satellites.

When the time adjustment information is generated based on satellite signals transmitted from a plurality of captured positioning information satellites, the reception levels of the satellite signals used to generate the time adjustment information are detected, and the time limit for generating the time adjustment information may be variably set based on the number of positioning information satellites captured and the lowest detected reception level.

An electronic timepiece according to a further aspect of the invention sets a capture time limit, e.g., six seconds, for capturing at least one of the positioning information satellites. If none of such satellites is captured within a specified capture time, reception of the satellite signal(s) is stopped to reduce wasteful power consumption.

In an electronic timepiece according to a further aspect of the invention, the time adjustment information generating unit includes a first operation mode in which the time adjustment information is generated based on satellite time information contained in the satellite information, and a second operation mode in which a position of the electronic timepiece is calculated based on the satellite time information and orbit information contained in the satellite information and the time adjustment information is generated based on the calculated position.

In accordance with further features of the invention, in the first operation mode, one of the positioning information satellites is captured and the satellite information obtained therefrom, and in the second operation mode, at least four of the positioning information satellites are captured and a plurality of satellite information obtained therefrom.

In yet a further aspect of the invention, the electronic timepiece further comprises a memory that stores time difference information that defines time difference data associated with a position, wherein, in the second operation mode, the time difference information is referenced to obtain time difference data associated with the calculated position, and the time adjustment information is generated using the time difference data.

DESCRIPTION OF THE PREFERRED EMBODIMENTS

Preferred embodiments of the present invention are described below with reference to the accompanying figures. Note that the embodiments described below do not unduly limit the scope of the invention described in the accompanying claims. In addition, the invention does not necessary require all aspects of the configurations described below.

1. GPS System 1-1 Summary

Figure 1:
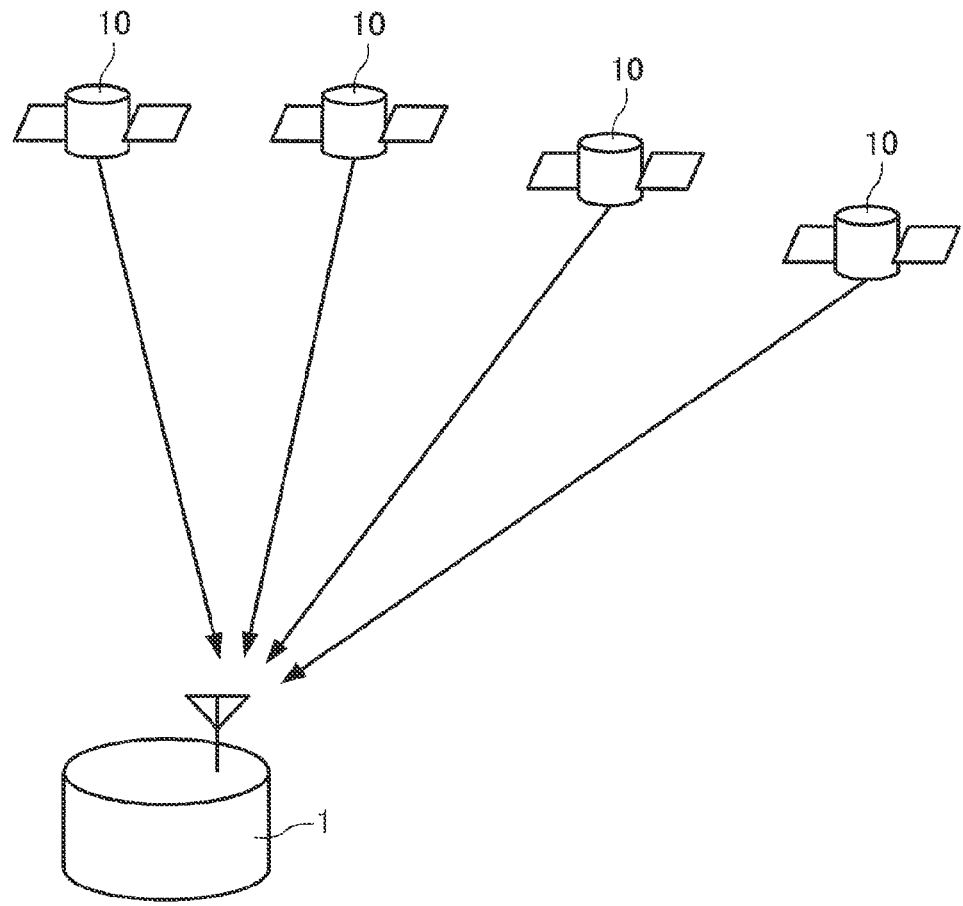
FIG. 1 is a schematic diagram describing a GPS system.

FIG. 1 schematically describes a GPS system.

GPS satellites 10 orbit the Earth on specific known orbits and transmit navigation messages superposed to a 1.57542 GHz carrier (L1 signal) to Earth. Note that these GPS satellites 10 are an example of a positioning information satellite in the invention, and the 1.57542 GHz carrier signal with a superposed navigation message (referred to below as the "satellite signal") is an example of a satellite signal in the invention.

There are currently approximately 30 GPS satellites 10 in orbit, and in order to identify the GPS satellite 10 from which a satellite signal was transmitted, each GPS satellite 10 superposes a unique 1023 chip (1 ms period) pattern called a Coarse/Acquisition Code (CA code) to the satellite signal. The C/A code is an apparently random pattern in which each chip is either +1 or −1. The C/A code superposed to the satellite signal can therefore be detected by correlating the satellite signal with the pattern of each C/A code.

Each GPS satellite 10 has an atomic clock on board, and the satellite signal carries the extremely accurate time information (called the "GPS time information" below) kept by the atomic clock. The miniscule time difference of the atomic clock on board each GPS satellite 10 is measured by a terrestrial control segment, and a time correction parameter for correcting the time difference is also contained in the satellite signal. A GPS wristwatch 1 can therefore receive the satellite signal transmitted from one GPS satellite 10 and adjust the internally kept time to the correct time by using the GPS time information and time correction parameter contained in the received signal.

Orbit information describing the location of the GPS satellite 10 on its orbit is also contained in the satellite signal. The GPS wristwatch 1 can perform a positioning calculation using the GPS time information and the orbit information. This positioning calculation assumes that there is a certain amount of error in the internal time kept by the GPS wristwatch 1. More specifically, in addition to the x, y, and z parameters for identifying the three-dimensional position of the GPS wristwatch 1, the time difference is also an unknown value. As a result, a GPS wristwatch 1 generally receives satellite signals transmitted from four or more GPS satellites, and performs the positioning calculation using the GPS time information and orbit information contained in the received signals.

1-2 Navigation Message

Figure 2A:
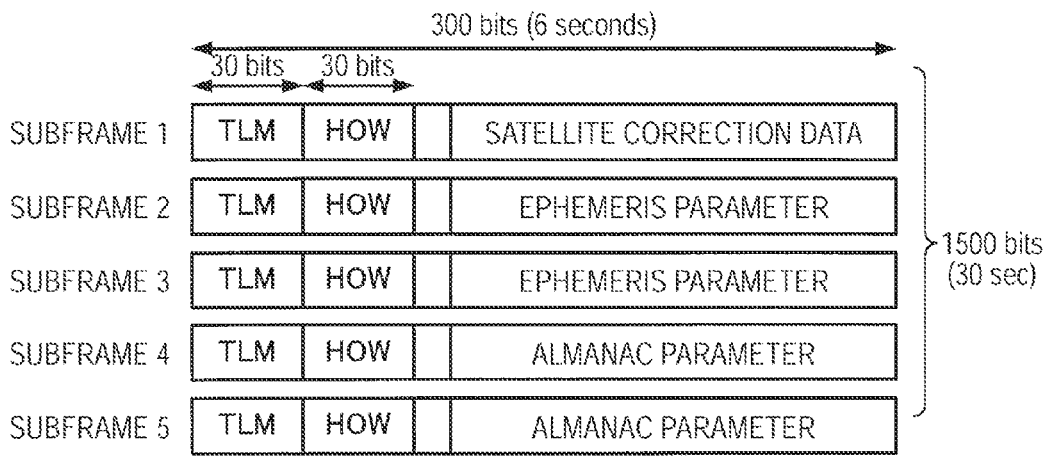
FIG. 2A to FIG. 2C describe the structure of a navigation message.
Figure 2B:
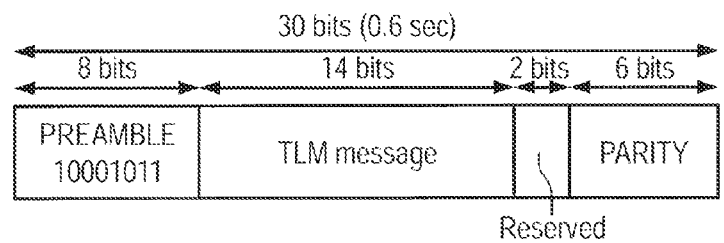
Figure 2C:
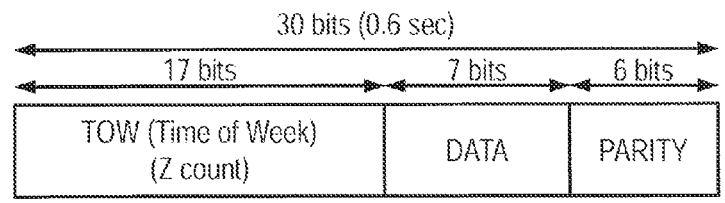

FIG. 2A to FIG. 2C describe the structure of the navigation message.

As shown in FIG. 2A, the navigation message is composed of data organized in a single main frame containing a total 1500 bits. The main frame is divided into five subframes of 300 bits each. The data in one subframe is transmitted in 6 seconds from each GPS satellite 10. It therefore requires 30 seconds to transmit the data in one main frame from each GPS satellite 10.

Subframe 1 contains satellite correction data such as the week number WN. The week number identifies the week to which the current GPS time information belongs. The GPS time starts at 00:00:00 on Jan. 6, 1980, and the number of the week that started that day is week number 0. The week number is updated every week.

Subframes 2 and 3 contain ephemeris data, that is, detailed orbit information for each GPS satellite 10. Subframes 4 and 5 contain almanac data (general orbit information for all GPS satellites 10 in the constellation).

Each of subframes 1 to 5 starts with a telemetry (TLM) word containing 30 bits of telemetry (TLM) data, followed by a HOW word containing 30 bits of HOW (handover word) data.

Therefore, while the TLM words and HOW words are transmitted at 6-second intervals from the GPS satellite 10, the week number data and other satellite correction data, ephemeris data, and almanac data are transmitted at 30-second intervals.

As shown in FIG. 2B, the TLM word contains preamble data, a TLM message, reserved bits, and parity data.

As shown in FIG. 2C, the HOW word contains time information called the TOW or Time of Week (also called the Z count). The Z count denotes in seconds the time passed since 00:00 of Sunday each week, and is reset to 0 at 00:00 of Sunday each week. More specifically, the Z count denotes the time passed from the beginning of each week in seconds, and the elapsed time is a value expressed in units of 1.5 seconds. Note, further, that the Z count denotes the time that the first bit of the next subframe data was transmitted. For example, the Z count transmitted in subframe 1 denotes the time that the first bit in subframe 2 was transmitted.

The HOW word also contains 3 bits of data denoting the subframe ID (also called the ID code). More specifically, the HOW words of subframes 1 to 5 shown in FIG. 2A contain the ID codes 001, 010, 011, 100, and 101, respectively.

The GPS wristwatch 1 can get the GPS time information by acquiring the week number value contained in subframe 1 and the HOW words (Z count data) contained in subframes 1 to 5. However, if the GPS wristwatch 1 has previously acquired the week number and internally counts the time passed from when the week number value was acquired, the current week number value of the GPS satellite can be obtained without acquiring the week number from the satellite signal. The GPS wristwatch 1 can therefore estimate the current GPS time information if the Z count is acquired. The GPS wristwatch 1 therefore normally acquires only the Z count as the time information.

Note that the TLM word, HOW word (Z count), satellite correction data, ephemeris, and almanac parameters are examples of satellite information in the invention.

The GPS wristwatch 1 may be rendered as a wristwatch with a GPS device (referred to herein as a GPS wristwatch). A GPS wristwatch is an example of an electronic timepiece according to the present invention, and a GPS wristwatch according to this embodiment of the invention is described next.

2. GPS Wristwatch
2-1 Embodiment 1
Configuration of a GPS Wristwatch

Figure 3B:
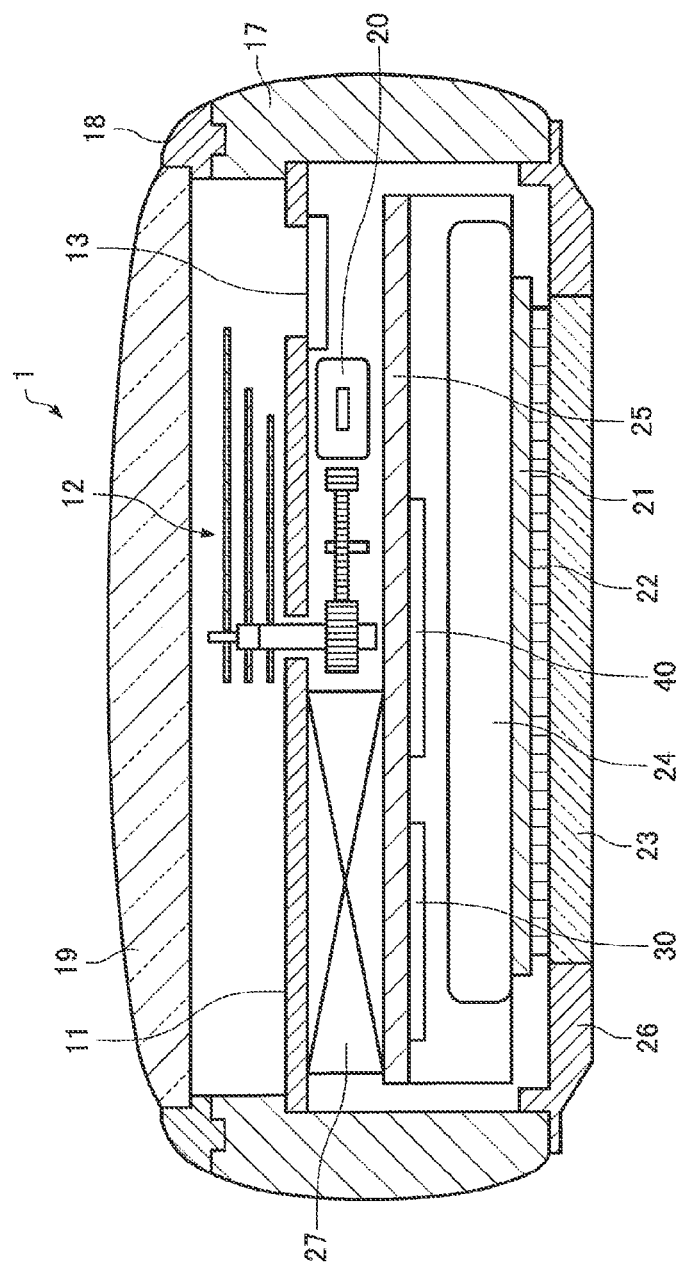
FIG. 3A and FIG. 3B describe the configuration of a GPS wristwatch according to a first embodiment of the invention.
Figure 3A:
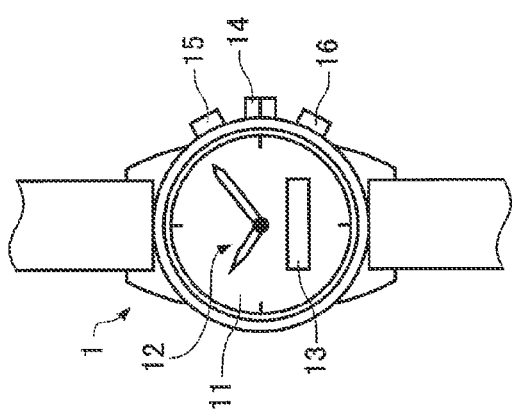

FIG. 3A and FIG. 3B are figures describing the configuration of a GPS wristwatch according to a first embodiment of the invention. FIG. 3A is a schematic plan view of a GPS wristwatch, and FIG. 3B is a schematic section view of the GPS wristwatch in FIG. 3A.

As shown in FIG. 3A, the GPS wristwatch 1 has a dial 11 and hands 12. A display 13 is disposed in a window is formed in a part of the dial 11. The display 13 may be an LCD (liquid crystal display) panel, and is used to display information such as the current latitude and longitude or the name of a city in the current time zone or location, or other message information. The hands 12 include a second hand, minute hand, and hour hand, and are driven through a wheel train by means of a stepping motor. The dial 11 and hands 12 function as a time information display unit in the invention.

By using the crown 14 and buttons 15 and 16, the GPS wristwatch 1 can be set to a mode (referred to below as the "time mode") for receiving a satellite signal from at least one GPS satellite 10 and adjusting the internal time information, or a mode (referred to below as the "positioning mode") for receiving satellite signals from a plurality of GPS satellites 10, calculating the position, and correcting the time difference of the internal time information. The GPS wristwatch 1 can also regularly (automatically) execute the time mode or positioning mode. Note that the time mode and positioning mode used in this embodiment of the invention correspond to the time adjustment mode and positioning mode in the invention.

As shown in FIG. 3B, the GPS wristwatch 1 has an outside case 17 that is made of stainless steel, titanium, or other metal.

The outside case 17 is basically cylindrically shaped, and a crystal 19 is attached to the opening on the face side of the outside case 17 by an intervening bezel 18. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 12, a GPS antenna 27, and a battery 24.

The stepping motor has a motor coil 19, a stator and a rotor, and drives the hands 12 by means of an intervening wheel train.

The GPS antenna GPS antenna 27 is an antenna for receiving satellite signals from a plurality of GPS satellites 10, and may be a patch antenna, helical antenna, or chip antenna, for example. The GPS antenna 27 is located on the opposite side of the dial 11 as the side on which the time is displayed (that is, on the back cover side), and receives RF signals through the crystal 19 and the dial 11.

The dial 11 and crystal 19 are therefore made from a material, such as plastic, that passes RF signals in the 1.5 GHz band. The bezel 18 is made from ceramic or other material that degrades reception performance less than a metal member.

A circuit board 25 is disposed on the back cover side of the GPS antenna 27, and a battery 24 is disposed on the back cover side of the circuit board 25.

Disposed to the circuit board 25 are a reception chip 18 including a reception circuit that processes satellite signals received by the GPS antenna 27, and a control chip 40 that controls, for example, driving the stepping motor. The reception chip 30 and control chip 40 are driven by power supplied from the battery 24.

The battery 24 is a lithium-ion battery or other type of rechargeable storage battery. A magnetic sheet 21 is disposed below (on the back cover side of) the battery 24. A charging coil 22 is disposed with the magnetic sheet 21 between it and the battery 24, and the battery 24 can be charged by the charging coil 22 by means of electromagnetic induction from an external charger.

The magnetic sheet 21 can also divert the magnetic field. The magnetic sheet 21 therefore reduces the effect of the battery 24 and enables the efficient transmission of energy. A back glass unit 23 is disposed in the center part of the back cover 26 to facilitate power transmission.

A lithium-ion battery or other storage battery is used as the battery 24 in this embodiment of the invention, but a lithium battery or other primary battery may be used instead. The charging method used when a storage battery is used is also not limited to charging by electromagnetic induction from an external charger through a charging coil 22. For example, a solar cell may be disposed to the GPS wristwatch 1 to generate electricity for charging the battery.

GPS Wristwatch Circuit Configuration

Figure 4:
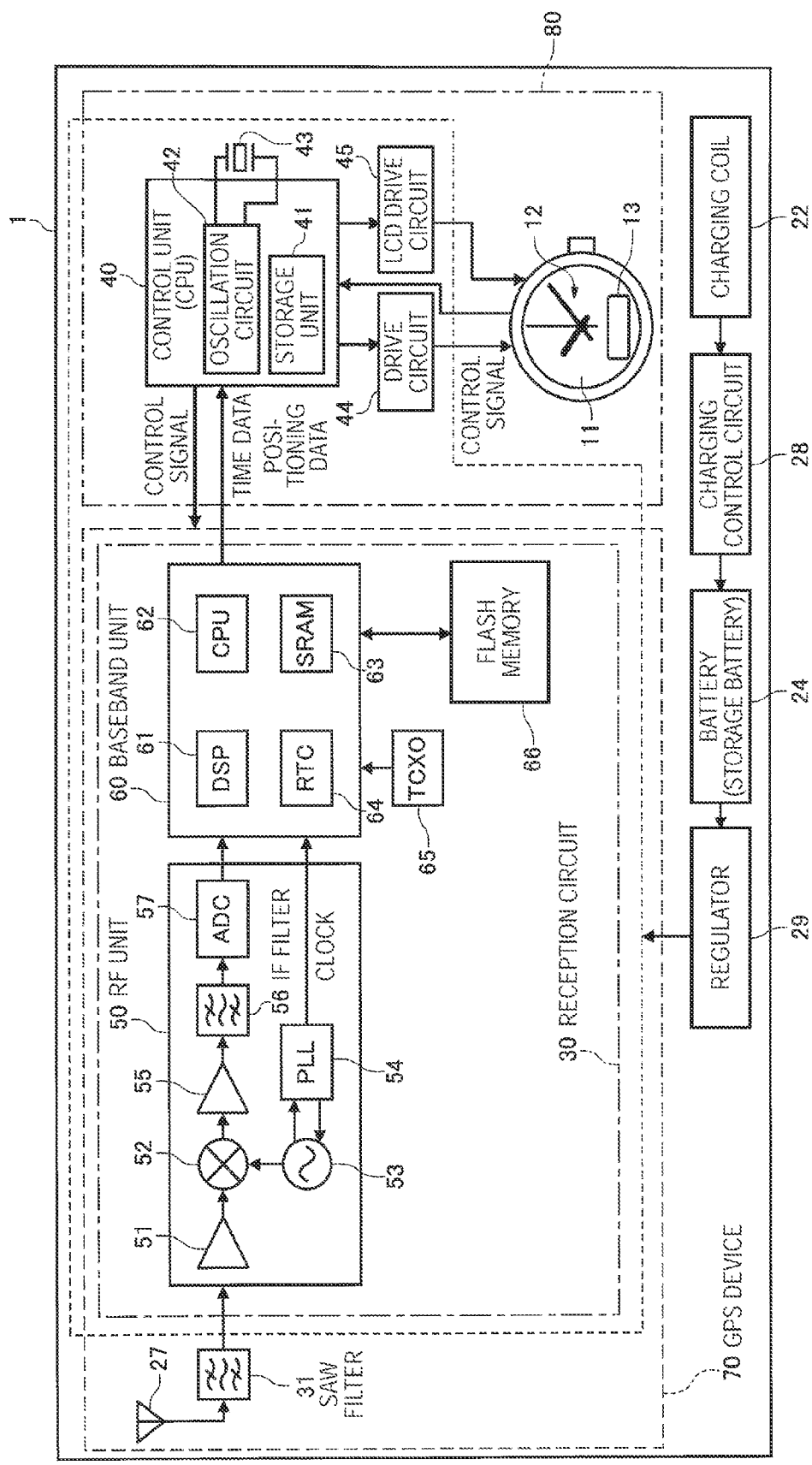
FIG. 4 describes the circuit configuration of a GPS wristwatch according to the first embodiment of the invention.

FIG. 4 describes the circuit configuration of a GPS wristwatch according to the first embodiment of the invention.

The GPS wristwatch 1 includes a GPS device 70 and a time display device 80.

The GPS device 70 includes the satellite signal reception unit, satellite capture unit, time adjustment information generating unit, and time limit setting unit of the invention, and executes the processes for receiving a satellite signal, capturing a GPS satellite 10, generating the time adjustment information, and setting the time limit of the time adjustment information generating process.

The time display device 80 includes the time information adjustment unit and time information display unit of the invention, and executes the processes for adjusting the internal time information and displaying the internal time information.

The charging coil 22 charges the battery 24 with electricity through the charging control circuit 28. The battery 24 supplies drive power through the regulator 29 to the GPS device 70 and time display device 80.

GPS Device Configuration

The GPS device 70 has a GPS antenna 27 and a SAW (surface acoustic wave) filter 31. As described in FIG. 3B, the GPS antenna 27 is an antenna for receiving satellite signals from a plurality of GPS satellites 10. The GPS antenna 27 can, however, also receive signals other than satellite signals. The SAW filter 31 executes a process that extracts a satellite signal from the signal received by the GPS antenna 27. More particularly, the SAW filter 31 is a bandpass filter that passes signals in the 1.5 GHz band.

The GPS device 70 includes a reception chip (reception circuit) 30. The reception circuit 30 includes an RF (radio frequency) unit 50 and a baseband unit 60. As further described below, the reception circuit 30 executes a process that acquires satellite information including orbit information and GPS time information contained in the navigation message from the 1.5 GHz satellite signal extracted by the SAW filter 31.

The RF unit 50 includes a low noise amplifier (LNA) 51, a mixer 52, a VCO (voltage controlled oscillator) 53, a PLL (phase locked loop) circuit 54, an IF (intermediate frequency) amplifier 55, and IF filter 56, and an A/D converter 57.

The satellite signal extracted by the SAW filter 31 is amplified by the LNA 51. The satellite signal amplified by the LNA 51 is mixed by the mixer 52 with a clock signal output from the VCO 53, and is down-converted to a signal in the intermediate frequency band. The PLL circuit 54 phase compares a reference clock signal and a clock signal obtained by frequency dividing the output clock signal of the VCO 53, and synchronizes the output clock signal of the VCO 53 to the reference clock signal. As a result, the VCO 53 can output a stable clock signal with the frequency precision of the reference clock signal. Note that a frequency of several megahertz can be selected as the intermediate frequency.

The signal mixed by the mixer 52 is then amplified by the IF amplifier 55. This mixing step of the mixer 52 generates a signal in the IF band and a high frequency signal of several gigahertz. As a result, the IF amplifier 55 amplifies the IF band signal and the high frequency signal of several gigahertz. The IF filter 56 passes the IF band signal and removes this high frequency signal of several gigahertz (or more particularly attenuates the signal to a specific level or less). The IF band signal passed by the IF filter 56 is then converted to a digital signal by the A/D converter 57.

The baseband unit 60 includes a DSP (digital signal processor) 61, CPU (central processing unit) 62, SRAM (static random access memory) 63, and RTC (real-time clock) 64. A TXCO (temperature-compensated crystal oscillator) 65 and flash memory 66 are also connected to baseband unit 60.

The TXCO 65 generates a reference clock signal of a substantially constant frequency irrespective of temperature.

Time difference information is stored in the flash memory 66. This time difference information is information with a defined time difference (such as the time correction to UTC linked to location coordinates (such as latitude and longitude)).

When the time mode or positioning mode is set, the baseband unit 60 demodulates the baseband signal from the digital signal (IF band signal) output by the A/D converter 57 of the RF unit 50.

In addition, when the time mode or positioning mode is set, the baseband unit 60 executes a process to generate a local code of the same pattern as each C/A code, and correlate the local code with the C/A code contained in the baseband signal, in the satellite search process described below. The baseband unit 60 also adjusts the output timing of the local code to achieve the peak correlation value to each local code, and when the correlation value equals or exceeds a threshold value, determines successful synchronization with the GPS satellite 10 matching that local code (that is, determines that the GPS satellite 10 was captured). The baseband unit 60 (CPU 62) thus functions as the satellite capture unit in the invention. Note that the GPS system uses a CDMA (code division multiple access) system enabling all GPS satellites 10 to transmit satellite signals at the same frequency using different C/A codes. Therefore, a GPS satellite 10 that can be captured can be found by evaluating the C/A code contained in the received satellite signal.

In order to acquire the satellite information from the captured GPS satellite 10 in the time mode and positioning mode, the baseband unit 60 executes a process to mix the local code having the same pattern as the C/A code of the GPS satellite 10 with the baseband signal. A navigation message containing the satellite information of the captured GPS satellite 10 is demodulated in the mixed signal. The baseband unit 60 then executes a process of detecting the TLM word in each subframe of the navigation message (the preamble data), and acquiring (and storing in SRAM 63, for example) the satellite information including the orbit information and GPS time information contained in each subframe. The GPS time information includes the week number (WN) and Z count data, but only the Z count data may be acquired if the week number (WN) data was previously acquired.

Based on the satellite information, the baseband unit 60 then generates the time adjustment information needed to correct the internal time information.

In the time mode, the baseband unit 60 more specifically calculates the time based on the GPS time information, and generates the time adjustment information. The time adjustment information in the time mode may, for example, be the GPS time information or the time difference between the GPS time information and the internal time information.

In the positioning mode, the baseband unit 60 more specifically calculates the position based on the GPS time information and orbit information to acquire location information (and more particularly to acquire the latitude and longitude of the position where the GPS wristwatch 1 is located during reception).

The baseband unit 60 also references the time difference information stored in the flash memory 66, and acquires the time difference data correlated to the coordinates (such as the longitude and latitude) of the GPS wristwatch 1 identified from the positioning information. The baseband unit 60 then generates the GPS time information and time difference data as the time adjustment information.

The time adjustment information in the positioning mode may be the GPS time information and time difference data as described above, or instead of using the GPS time information may be data describing the time difference between the internal time information and the GPS time information.

Note, further, that the baseband unit 60 may generate time adjustment information from the satellite information from one GPS satellite 10, or it may generate the time adjustment information from the satellite information from a plurality of GPS satellites 10.

In other words, the baseband unit 60 (CPU 62) functions as a time adjustment information generating unit including a satellite information acquisition unit, time calculation unit, and position calculation unit.

In the time mode, the baseband unit 60 (CPU 62) sets a variable time limit for the time from when a GPS satellite 10 is captured until the time adjustment information is generated according to the reception level of the satellite signal sent from the captured GPS satellite 10. For example, if the reception level of the satellite signal transmitted from the captured GPS satellite 10 is less than a set level, the baseband unit 60 (CPU 62) sets a time limit that is shorter than when the reception level is higher than the set level.

In the positioning mode, the baseband unit 60 (CPU 62) sets a variable time limit for the time from when a GPS satellite 10 is captured until the time adjustment information is generated according to the number of GPS satellites 10 captured and the reception level of the satellite signal sent from the captured GPS satellite 10. For example, if the number of captured GPS satellites 10 is less than or equal to a set number and the reception level of the satellite signal transmitted from the captured GPS satellite 10 is less than a set level, the baseband unit 60 (CPU 62) sets a time limit that is shorter than when the number of GPS satellites 10 is greater than the set number or when the reception level is higher than the set level.

The baseband unit 60 (CPU 62) thus functions as the time limit setting component in the invention. The GPS device 70 also functions as the satellite signal reception unit of the invention using the GPS antenna 27, SAW filter 31, RF unit 50, and part of the baseband unit.

Note that operation of the baseband unit 60 is synchronized to the reference clock signal output by the TXCO 65. The RTC 64 generates the timing for processing the satellite signal. The RTC 64 counts up at the reference clock signal output from the TXCO 65.

Time Display Device Configuration

The time display device 80 includes a control chip 40 (control unit), a drive circuit 44, an LCD drive circuit 45, and a crystal oscillator 43.

The control unit 40 includes a storage unit 41 and oscillation circuit 42 and controls various operations.

The control unit 40 controls the GPS device 70. More specifically, the control unit 40 sends a control signal to the reception circuit 30 and controls the reception operation of the GPS device 70.

The control unit 40 also controls driving the hands 12 through the drive circuit 44. The control unit 40 also controls driving the display 13 through the LCD drive circuit 45. For example, in the positioning mode the control unit 40 controls the display 13 to display the current position.

The internal time information is stored in the storage unit 41. The internal time information is information about the time kept internally by the GPS wristwatch 1. This internal time information is updated by the reference clock signal generated by the crystal oscillator 43 and oscillation circuit 42. The internal time information can therefore be updated and moving the hands 12 can continue even when power supply to the reception circuit 30 has stopped.

When the time mode is set, the control unit 40 controls operation of the GPS device 70, corrects the internal time information based on the GPS time information and saves the corrected time in the storage unit 41. More specifically, the internal time information is adjusted to the UTC (Universal Time Code), which is acquired by adding the UTC offset (the current time+14 seconds) to the acquired GPS time information.

When the positioning mode is set, the control unit 40 controls operation of the GPS device 70, corrects the internal time information based on the GPS time information and the time difference data, and stores the corrected time in the storage unit 41.

The control unit 40 thus functions as a time information adjustment unit in the invention.

The time adjustment process (time mode) and the time difference adjustment process (positioning mode) in this first embodiment of the invention are described next.

Figure 5:
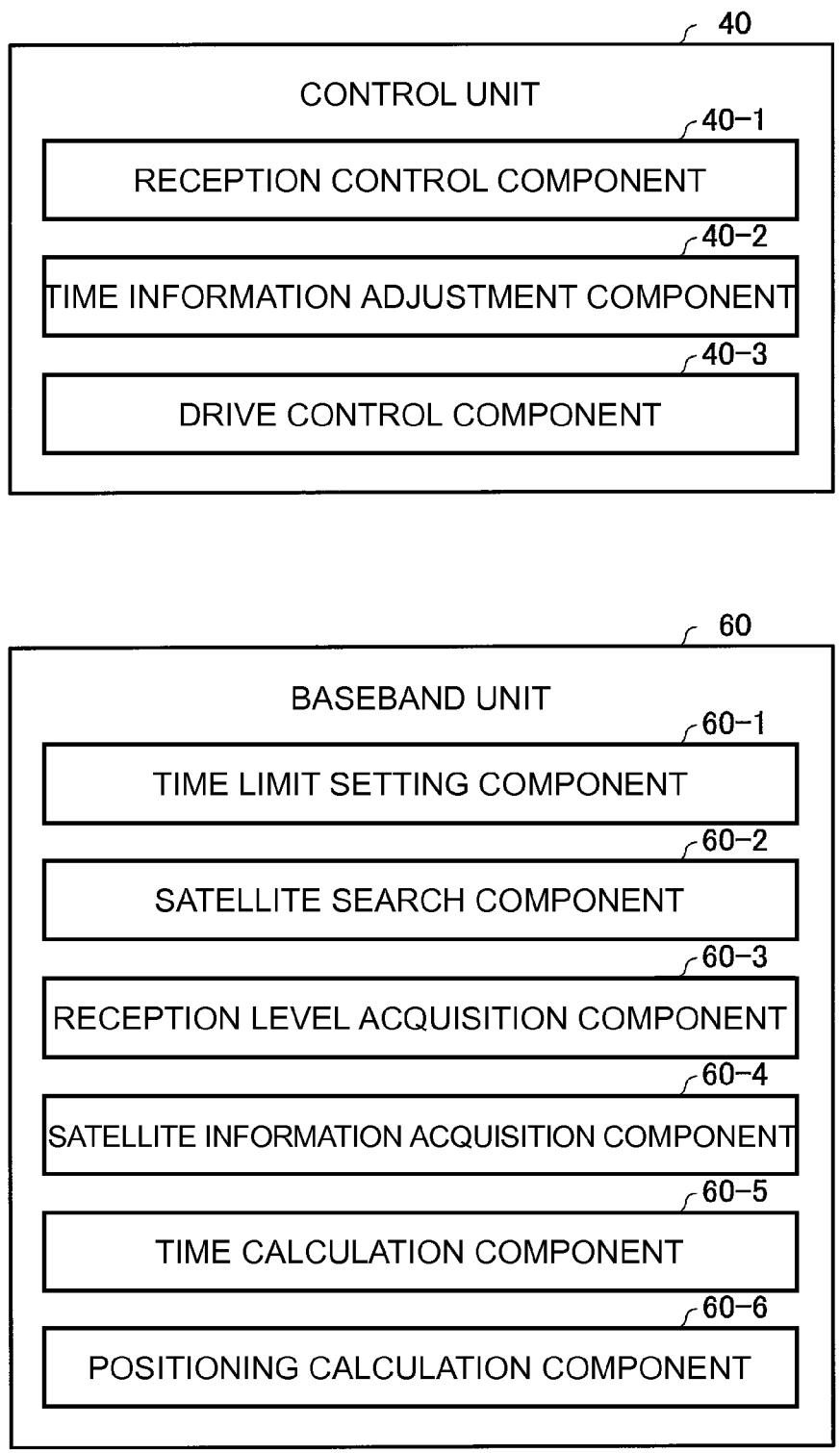
FIG. 5 describes the configuration of the control unit in the first embodiment of the invention.

Note that the control unit 40 and baseband unit 60 can be rendered as dedicated circuits for controlling these processes, or can execute a control program stored in the storage unit 41 and SRAM 63, for example, to control these processes. Yet more specifically, as shown in FIG. 5, the time adjustment process (time mode) and the time difference adjustment process (positioning mode) can be executed by the control unit 40 functioning as a reception control component 40-1, time information adjustment component 40-2, and drive control component 40-3, and the baseband unit 60 functioning as a time limit setting component 60-1, satellite search component 60-2, reception level acquisition component 60-3, satellite information acquisition component 60-4, time calculation component 60-5, and positioning calculation component 60-6.

Time Adjustment Process (Time Mode)

Figure 6:
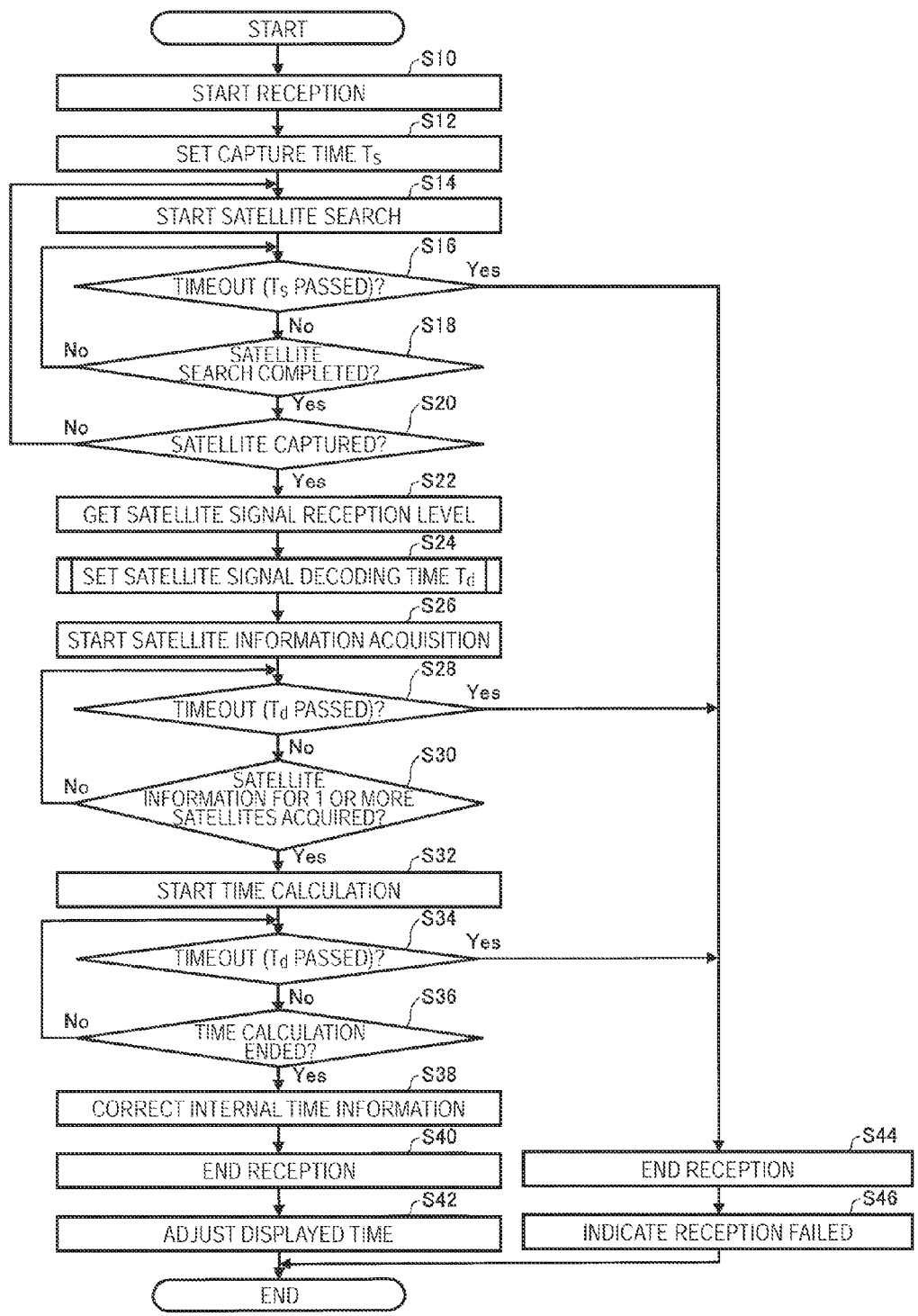
FIG. 6 is a flow chart describing an example of a time adjustment process according to the first embodiment of the invention.

FIG. 6 is a flow chart showing an example of the time adjustment process (time mode) of a GPS wristwatch according to a first embodiment of the invention.

The GPS wristwatch 1 executes the time adjustment process (time mode) shown in FIG. 6 when the time mode is set.

When the time adjustment process (time mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10).

When reception starts, the baseband unit 60 (time limit setting component 60-1) sets the capture time $T_s$ (step S12).

This capture time $T_s$ is the time limit for completing the satellite search process described below from when the GPS device 70 starts the reception operation. The capture time $T_s$ is set, for example, to 6 seconds. Note that the capture time $T_s$ may be set before reception starts.

The baseband unit 60 (satellite search component 60-2) then starts the satellite search process (satellite search step) (step S14). In the satellite search step the GPS device 70 executes a process of searching for a GPS satellite 10 that can be captured.

More specifically, if there are, for example, thirty GPS satellites 10, the baseband unit 60 (satellite search component 60-2) generates a local code with the same C/A code as the satellite number SV while changing the satellite number SV sequentially from 1 to 30. The baseband unit 60 (satellite search component 60-2) then calculates the correlation between the local code and the C/A code contained the baseband signal. If the C/A code contained in the baseband signal and the local code are the same, the correlation value will peak at a specific time, but if they are different codes, the correlation value will not have a peak and will always be substantially 0.

The baseband unit 60 (satellite search component 60-2) adjusts the output timing of the local code so that the correlation value of the local code and the C/A code in the baseband signal goes to the peak, and determines that the GPS satellite 10 of the satellite number SV was captured if the correlation value is greater than or equal to the set threshold value. The baseband unit 60 (satellite search component 60-2) then saves the information (such as the satellite number) of the captured GPS satellite 10 in SRAM 63, for example.

The baseband unit 60 (satellite search component 60-2) then determines if the satellite search process was completed before the capture time $T_s$ passed (step S18). For example, when the baseband unit 60 (satellite search component 60-2) searches the GPS satellites 10 while changing the satellite number SV from 1 to 30, whether the satellite search process ended can be determined by determining if searching for the GPS satellite 10 selected as satellite number SV 30 ended.

If the capture time $T_s$ passes before the baseband unit 60 (satellite search component 60-2) completes the satellite search process (step S16 returns Yes), the reception operation of the GPS device 70 is unconditionally aborted (step S44). If the GPS wristwatch 1 is located in an environment where reception is not possible, such as certain indoor locations, the possibility of being able to capture a GPS satellite 10 is extremely low even after searching for all GPS satellites 10 in the constellation. By unconditionally terminating the GPS satellite 10 search when the capture time $T_s$ passes without detecting a GPS satellite 10 that can be captured, the GPS wristwatch 1 can reduce wasteful power consumption.

However, if the satellite search step ends before the capture time $T_s$ passes (step S18 returns Yes), the baseband unit 60 (satellite search component 60-2) determines if a GPS satellite 10 was captured or not (step S20).

If a GPS satellite 10 could not be captured (step S20 returns No), the baseband unit 60 (satellite search component 60-2) restarts the satellite search step (step S14).

However, if the GPS satellite 10 was captured (step S20 returns Yes), the baseband unit 60 (reception level acquisition component 60-3) detects the reception level of the satellite signal sent from the captured GPS satellite 10 (step S22). More specifically, the baseband unit 60 (reception level acquisition component 60-3) acquires the reception level by mixing the baseband signal with the local code having the same pattern as the C/A code of the captured GPS satellite 10, and calculating the signal power of the mixed signal. The baseband unit 60 (reception level acquisition component 60-3) then saves the reception level of the satellite signal sent from the captured GPS satellite 10 to SRAM 63 or other storage unit.

The baseband unit 60 (time limit setting component 60-1) then sets the satellite signal decoding time $T_d$ based on the number of captured GPS satellites 10 and the reception level of the satellite signal transmitted from the GPS satellite 10 (step S24). Note that this satellite signal decoding time $T_d$ corresponds to the time limit for the time adjustment information generating unit of the invention to generate the time adjustment information.

The baseband unit 60 (satellite information acquisition component 60-4) then starts acquiring the satellite information (particularly the GPS time information) of the captured GPS satellite 10 (step S26). More specifically, the baseband unit 60 (satellite information acquisition component 60-4) executes a process of demodulating the navigation message from each captured GPS satellite and acquiring the Z count data. The baseband unit 60 (satellite information acquisition component 60-4) then stores the acquired GPS time information in SRAM 63, for example.

If the satellite signal decoding time $T_d$ passes before the baseband unit 60 (satellite information acquisition component 60-4) acquires satellite information from one or more GPS satellites 10 (step S28 returns Yes), the reception operation of the GPS device 70 ends unconditionally (step S44). The satellite signal decoding time $T_d$ may pass without being able to correctly demodulate the satellite information for one or more GPS satellites 10 because the reception level of the satellite signal from the GPS satellite 10 is low, for example.

However, if the satellite information for one or more GPS satellites 10 is successfully acquired before the satellite signal decoding time $T_d$ passes (step S30 returns Yes), the baseband unit 60 (time calculation component 60-5) selects one or more GPS satellites 10 from among the captured GPS satellites 10 and starts the time calculation (step S32).

More specifically, the baseband unit 60 (time calculation component 60-5) reads the satellite information (GPS time information) for the selected GPS satellite 10 from SRAM 63, for example, and generates the time adjustment information.

As described above, the GPS time information represents the time that the GPS satellite 10 transmitted the first bit of a subframe of the navigation message. The baseband unit 60 (time calculation component 60-5) can therefore calculate the time difference between the GPS time information and the time denoted by the internal time information when the first bit of the subframe was received as the time adjustment information required to correct the internal time information, for example. The baseband unit 60 (time calculation component 60-5) can also generate more precise time adjustment information based on the GPS time information from a plurality of GPS satellites 10. The time calculation ends if the baseband unit 60 (time calculation component 60-5) can generate the time adjustment information.

If the satellite signal decoding time $T_d$ passes before the baseband unit 60 (time calculation component 60-5) ends the time calculation (step S34 returns Yes), the reception operation of the GPS device 70 ends unconditionally (step S44).

However, if the time calculation ends before the satellite signal decoding time $T_d$ passes (step S36 returns Yes), the control unit 40 (time information adjustment component 40-2) uses the time adjustment information to correct the internal time information stored in the storage unit 41 (step S38).

The reception operation of the GPS device 70 then ends (step S40).

Finally, the control unit 40 (drive control component 40-3) controls the drive circuit 44 or LCD drive circuit 45 based on the corrected internal time information to adjust the displayed time (step S42).

Note that if the reception operation of the GPS device 70 ends unconditionally (step S44), the control unit 40 (drive control component 40-3) controls the drive circuit 44 or LCD drive circuit 45 to display an indication that reception failed (step S46).

Figure 7:
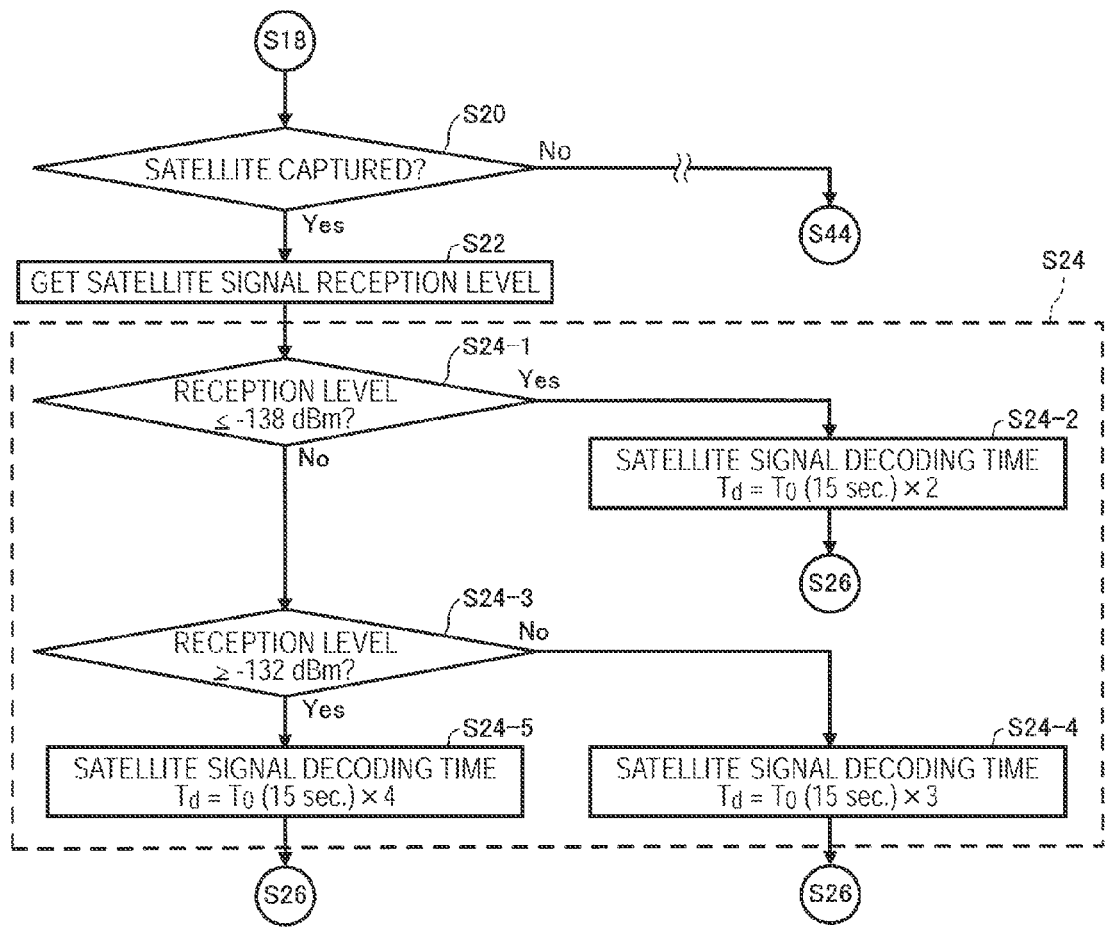
FIG. 7 is a flow chart describing an example of the satellite signal decoding time setting process in the time adjustment process according to the first embodiment of the invention.

FIG. 7 is a flow chart showing an example of the satellite signal decoding time setting process (step S24 in FIG. 6) in the time adjustment process (time mode) of the GPS wristwatch according to the first embodiment of the invention.

In the satellite signal decoding time setting process shown in FIG. 7 the baseband unit 60 (time limit setting component 60-1) sets the variable satellite signal decoding time $T_d$ according to the reception level of the satellite signal from the GPS satellite 10 that is used to calculate the time.

More specifically, if the reception level of the satellite signal from the GPS satellite 10 used for time calculation is less than or equal to −138 dBm (step S24-1 returns Yes), the baseband unit 60 (time limit setting component 60-1) sets the satellite signal decoding time $T_d$ to $T_d=T_0$ (15 sec.)×2=30 seconds (step S24-2).

If the reception level of the satellite signal is greater than −138 dBm and less than −132 dBm (step S24-1 returns No and step S24-3 returns No), the baseband unit 60 (time limit setting component 60-1) sets the satellite signal decoding time $T_d$ to $T_d=T_0$ (15 sec.)×3=45 seconds (step S24-4).

If the reception level of the satellite signal is greater than or equal to −132 dBm (step S24-3 returns Yes), the baseband unit 60 (time limit setting component 60-1) sets the satellite signal decoding time $T_d$ to $T_d=T_0$(15 sec.)×4=60 seconds (step S24-5).

Time Difference Adjustment Process (Positioning Mode)

Figure 8:
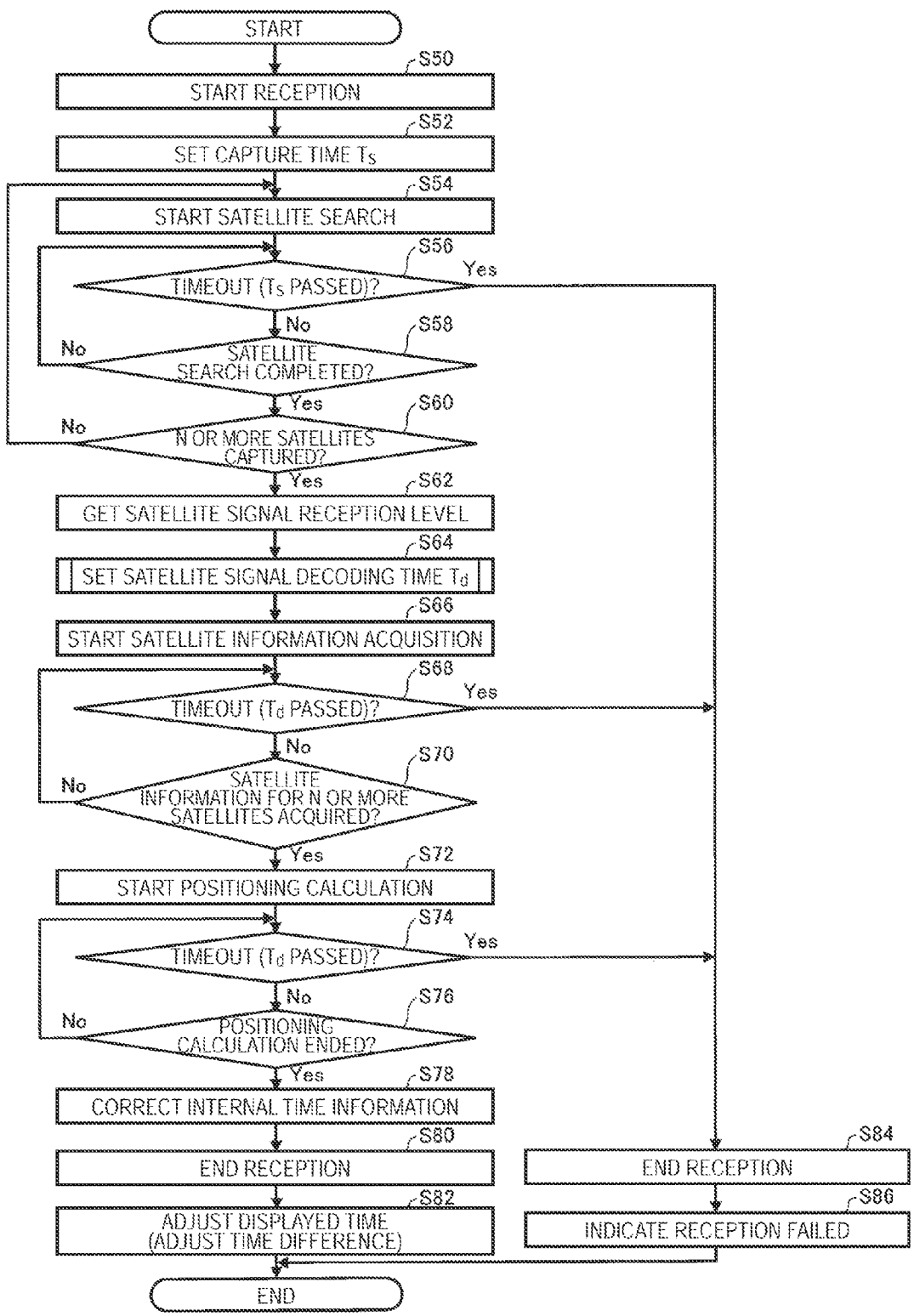
FIG. 8 is a flow chart showing an example of the time difference adjustment process according to the first embodiment of the invention.

FIG. 8 is a flow chart showing an example of the time difference adjustment process (positioning mode) of the GPS wristwatch according to the first embodiment of the invention. Note that further description of steps that are the same as a step in the time adjustment process (time mode) described above is omitted or simplified below.

When the positioning mode is set, the GPS wristwatch 1 executes the time difference adjustment process (positioning mode) shown in FIG. 8.

When the time difference adjustment process (positioning mode) starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S50).

When reception starts, the baseband unit 60 (time limit setting component 60-1) sets the capture time $T_s$ (step S52).

The baseband unit 60 (satellite search component 60-2) then starts the satellite search process (satellite search step) (step S54).

The baseband unit 60 (satellite search component 60-2) then determines if the satellite search process was completed before the capture time $T_s$ passed (step S58).

If the capture time $T_s$ passes before the baseband unit 60 (satellite search component 60-2) completes the satellite search process (step S56 returns Yes), the reception operation of the GPS device 70 is unconditionally aborted (step S84).

However, if the satellite search step ends before the capture time $T_s$ passes (step S58 returns Yes), the baseband unit 60 (satellite search component 60-2) determines if at least a specified number (N) of GPS satellites 10 was captured (step S60).

In order to determine the three-dimensional position (x, y, z) of the GPS wristwatch 1, three unknown values x, y, and z are needed. This means that in order to calculate the three-dimensional location (x, y, z) of the GPS wristwatch 1, GPS time information and orbit information is required for three or more GPS satellites 10. In addition, considering that the time difference between the GPS time information and the internal time information of the GPS wristwatch 1 is another unknown that is needed for even higher positioning accuracy, GPS time information and orbit information is needed for four or more GPS satellites 10.

If N (where N=4, for example) or more GPS satellites 10 could not be captured (step S60 returns No), the baseband unit 60 (satellite search component 60-2) restarts the satellite search step (step S54).

However, if N (where N=4, for example) or more GPS satellites 10 were captured (step S60 returns Yes), the baseband unit 60 (reception level acquisition component 60-3) detects the reception levels of the satellite signals sent from each of the captured GPS satellites 10 (step S62). The baseband unit 60 (reception level acquisition component 60-3) then saves the reception levels of the satellite signals sent from the captured GPS satellites 10 to SRAM 63 or other storage unit.

The baseband unit 60 (time limit setting component 60-1) then sets the satellite signal decoding time $T_d$ based on the number of captured GPS satellites 10 and the reception levels of the satellite signals transmitted from the GPS satellites 10 (step S64).

The baseband unit 60 (satellite information acquisition component 60-4) then starts acquiring the satellite information (particularly the GPS time information and orbit information) from the captured GPS satellites 10 (step S66). More specifically, the baseband unit 60 (satellite information acquisition component 60-4) executes a process of demodulating the navigation messages from each captured GPS satellite and acquiring the Z count data and ephemeris data. The baseband unit 60 (satellite information acquisition component 60-4) then stores the acquired GPS time information and orbit information in SRAM 63, for example.

If the satellite signal decoding time $T_d$ passes before the baseband unit 60 (satellite information acquisition component 60-4) acquires satellite information from N (where N is 4, for example) or more GPS satellites 10 (step S68 returns Yes), the reception operation of the GPS device 70 ends unconditionally (step S84). The satellite signal decoding time $T_d$ may pass without being able to correctly demodulate the satellite information for N (where N is 4, for example) or more GPS satellites 10 because the reception level of the satellite signal from a GPS satellite 10 is low, for example.

However, if the satellite information for N (where N is 4, for example) or more GPS satellites 10 is successfully acquired before the satellite signal decoding time $T_d$ passes (step S70 returns Yes), the baseband unit 60 (positioning calculation component 60-6) selects the group of N (where N is 4, for example) GPS satellites 10 from among the captured GPS satellites 10 and starts the positioning calculation (step S72).

More specifically, the baseband unit 60 (time calculation component 60-5) reads the satellite information (GPS time information) for the selected N (where N is 4, for example) GPS satellite 10 from SRAM 63, for example, and generates the positioning information (the longitude and latitude (coordinates) of the location where the GPS wristwatch 1 is positioned).

As described above, the GPS time information represents the time that the GPS satellite 10 transmitted the first bit of a subframe of the navigation message. Based on the difference between the GPS time information and the internal time information when the first bit of the subframe was received, and the time correction data, the baseband unit 60 (positioning calculation component 60-6) can calculate the pseudorange between the GPS wristwatch 1 and each of the N (where N is 4, for example) GPS satellites 10. The baseband unit 60 (positioning calculation component 60-6) can also calculate the position of each of the N (where N is 4, for example) GPS satellites 10 based on the orbit information. Finally, based on the pseudorange to the GPS wristwatch 1 of each of the N (where N is 4, for example) GPS satellites 10 and the locations of the N (where N is 4, for example) GPS satellites 10, the baseband unit 60 (positioning calculation component 60-6) can generate the positioning information of the GPS wristwatch 1, that is, determine the position.

The baseband unit 60 (positioning calculation component 60-6) then references the time difference information stored in the flash memory 66, and gets the time difference data linked to the coordinates (longitude and latitude) of the GPS wristwatch 1 identified from the positioning information.

The baseband unit 60 (positioning calculation component 60-6) then ends the positioning calculation if the GPS time information and time difference data can be generated as the time adjustment information.

If the satellite signal decoding time $T_d$ passes before the baseband unit 60 (positioning calculation component 60-6) ends the positioning calculation (step S74 returns Yes), the reception operation of the GPS device 70 ends unconditionally (step S84).

However, if the positioning calculation ends before the satellite signal decoding time $T_d$ passes (step S76 returns Yes), the control unit 40 (time information adjustment component 40-2) uses the time adjustment information to correct the internal time information stored in the storage unit 41 (step S78).

The reception operation of the GPS device 70 then ends (step S80).

Finally, the control unit 40 (drive control component 40-3) controls the drive circuit 44 or LCD drive circuit 45 based on the corrected internal time information to adjust the displayed time (step S82).

Note that if the reception operation of the GPS device 70 ends unconditionally (step S84), the control unit 40 (drive control component 40-3) controls the drive circuit 44 or LCD drive circuit 45 to display an indication that reception failed (step S86).

Figure 9:
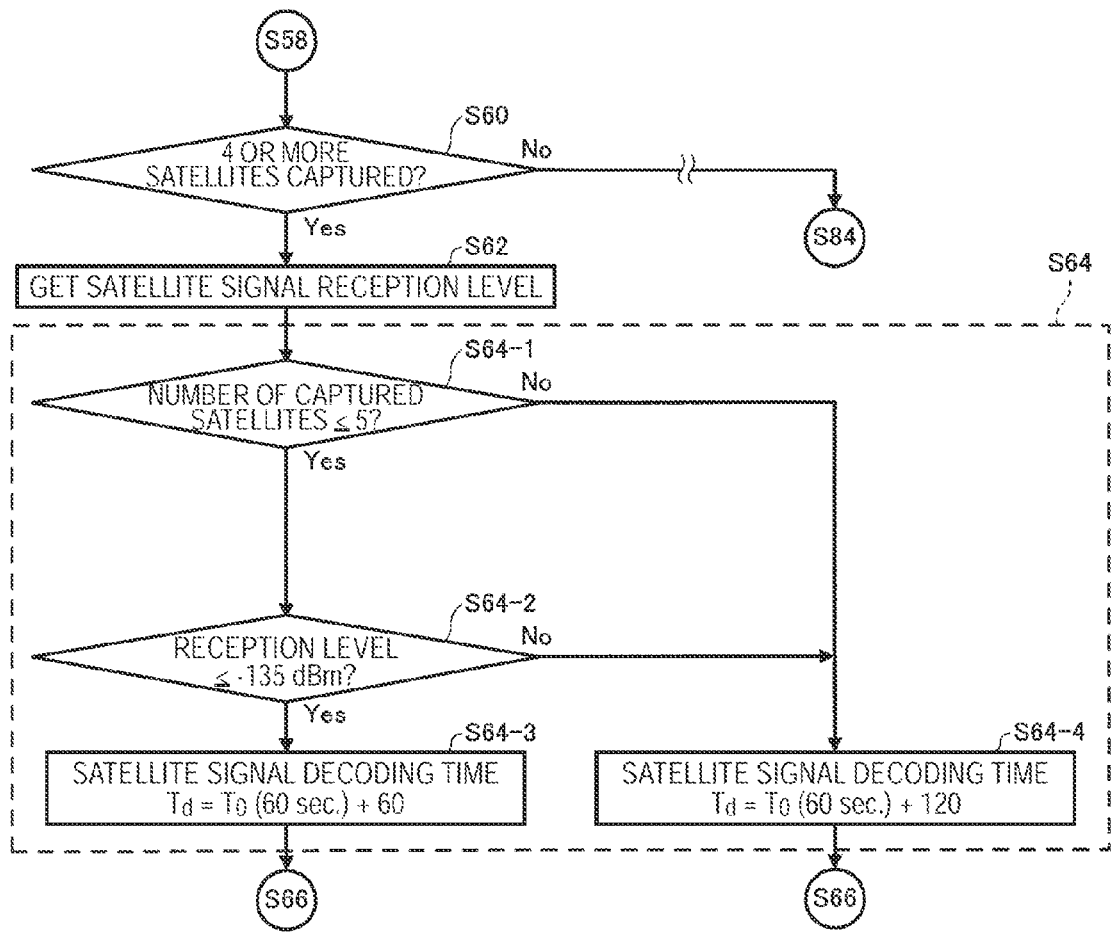
FIG. 9 is a flow chart describing an example of the satellite signal decoding time setting process in the time difference adjustment process according to the first embodiment of the invention.
Figure 10:
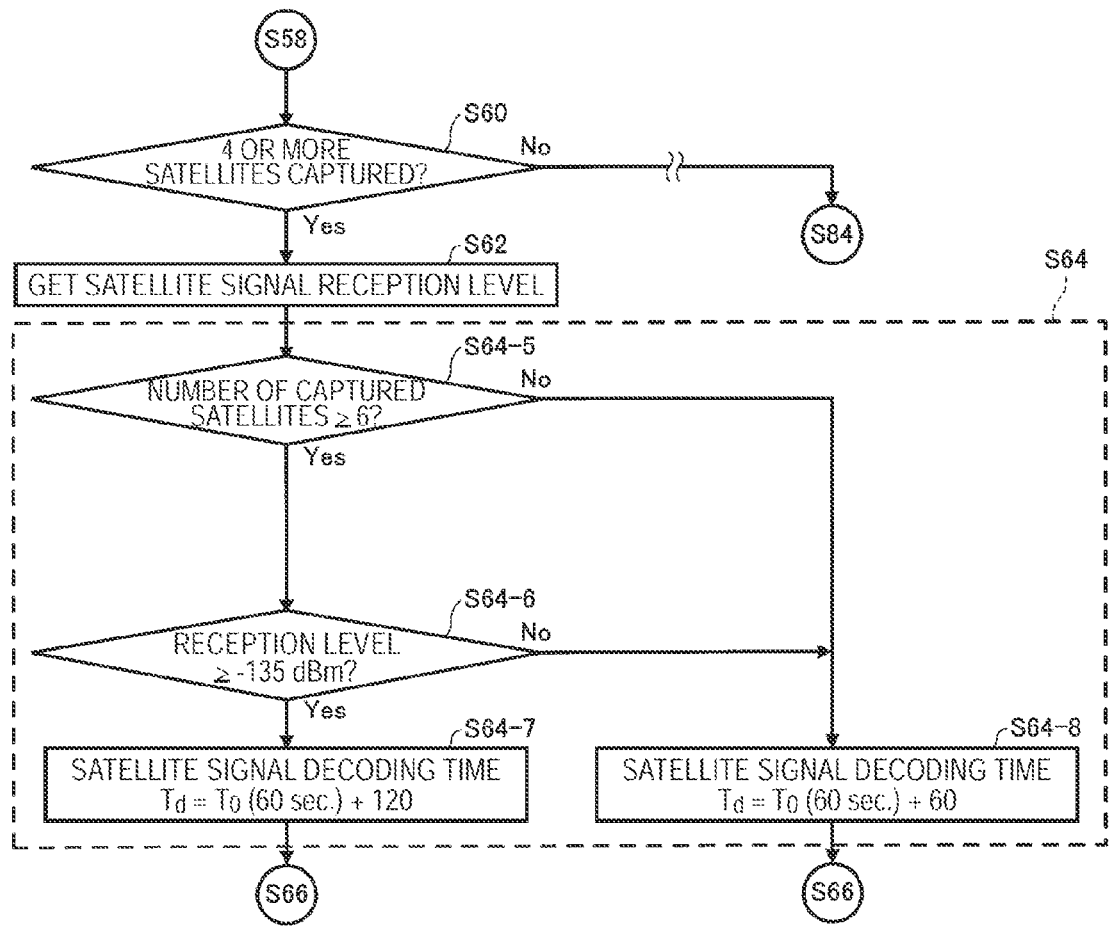
FIG. 10 is a flow chart showing another example of a satellite signal decoding time setting process in the time difference adjustment process according to the first embodiment of the invention.

FIG. 9 and FIG. 10 are flow charts showing examples of the satellite signal decoding time setting process (step S64 in FIG. 8) in the time difference adjustment process (positioning mode) of the GPS wristwatch according to the first embodiment of the invention.

In the satellite signal decoding time setting process shown in FIG. 9 and FIG. 10, the baseband unit 60 (time limit setting component 60-1) sets the variable satellite signal decoding time $T_d$ according to the number of GPS satellites 10 captured and the reception levels of the satellite signals from the 4 GPS satellites 10 that are used to calculate the position.

In the satellite signal decoding time setting process shown in FIG. 9, if the number of captured GPS satellites 10 is 5 or less (step S64-1 returns Yes), and the minimum reception level of the satellite signals from the 4 GPS satellites 10 used for the positioning calculation is less than or equal to −135 dBm (step S64-2 returns Yes), the baseband unit 60 (time limit setting component 60-1) sets the satellite signal decoding time $T_d$ to $T_d=T_0$ (60 sec.)+60 seconds=120 seconds (step S64-3).

If the number of captured GPS satellites 10 is more than 5 (step S64-1 returns No), or the minimum reception level of the satellite signals from the 4 GPS satellites 10 used for the positioning calculation is greater than −135 dBm (step S64-2 returns No), the baseband unit 60 (time limit setting component 60-1) sets the satellite signal decoding time $T_d$ to $T_d=T_0$ (60 sec.)+120 seconds=180 seconds (step S64-4).

In the satellite signal decoding time setting process shown in FIG. 10, if the number of captured GPS satellites 10 is 6 or more (step S64-5 returns Yes), and the minimum reception level of the satellite signals from the 4 GPS satellites 10 used for the positioning calculation is greater than or equal to −135 dBm (step S64-6 returns Yes), the baseband unit 60 (time limit setting component 60-1) sets the satellite signal decoding time $T_d$ to $T_d=T_0$ (60 sec.)+120 seconds=180 seconds (step S64-7).

If the number of captured GPS satellites 10 is less than 6 (step S64-5 returns No), or the minimum reception level of the satellite signals from the 4 GPS satellites 10 used for the positioning calculation is less than −135 dBm (step S64-6 returns No), the baseband unit 60 (time limit setting component 60-1) sets the satellite signal decoding time $T_d$ to $T_d=T_0$ (60 sec.)+60 seconds=120 seconds (step S64-8).

Effect of Embodiment 1

As described in FIG. 6 to FIG. 10, a GPS wristwatch according to a first embodiment of the invention sets a variable satellite signal decoding time $T_d$ based on the number of captured GPS satellites 10 and the reception level of the satellite signals sent from the captured GPS satellites 10. Because the number of GPS satellites 10 that are candidates for acquiring the satellite information increases as the number of captured GPS satellites 10 increases, the probability of being able to acquire the satellite information rises. More specifically, the higher the number of captured GPS satellites 10, the better the reception conditions can be said to be.

In addition, the higher the reception level of the satellite signals transmitted from the captured GPS satellites 10, the more resistant reception is to noise, and the probability of being able to acquire the satellite information therefore increases. More specifically, the higher the reception level of the satellite signals, the better the reception conditions can be said to be.

The GPS wristwatch according to this embodiment of the invention can therefore optimize power consumption because it can appropriately set the satellite signal decoding time $T_d$ according to the reception conditions.

As shown in FIG. 6 and FIG. 8, the GPS wristwatch according to this embodiment of the invention stops satellite signal reception when the time adjustment information cannot be generated within the satellite signal decoding time $T_d$. The GPS wristwatch according to this embodiment of the invention can therefore prevent wasteful power consumption when the time adjustment information cannot be generated within the satellite signal decoding time $T_d$, and can reduce the possibility of a system shutdown.

As shown in FIG. 7, FIG. 9, and FIG. 10, the GPS wristwatch according to this embodiment of the invention can change the satellite signal decoding time $T_d$ according to whether the time mode or the positioning mode is set. In general, the positioning mode takes longer to generate the time adjustment information because a plurality of (such as 4 or more) GPS satellites 10 are captured and plural satellite information sets are acquired in the positioning mode while the time mode can get the satellite information by capturing only one GPS satellite 10. The GPS wristwatch according to the first embodiment of the invention can set the satellite signal decoding time $T_d$ in the positioning mode longer than the satellite signal decoding time $T_d$ in the time mode.

As described in FIG. 7, when the reception level of the satellite signal sent from the captured GPS satellite 10 is less than a set value (−138 dBm) (when the reception conditions are relatively poor) in the time mode, the GPS wristwatch according to the first embodiment sets the satellite signal decoding time $T_d$ shorter than when the reception level is greater than the set value (−138 dBm) (when the reception conditions are relatively good).

As shown in FIG. 9, when the number of captured GPS satellites 10 is less than or equal to a set number (5), and the reception level of the satellite signals sent from the captured GPS satellites 10 is less than a set value (−135 dBm) (when the reception conditions are quite poor) in the positioning mode, the GPS wristwatch according to the first embodiment sets the satellite signal decoding time $T_d$ shorter than when the number of captured GPS satellites 10 is greater than the set number (5) or the reception level is greater than the set value (−135 dBm) (when the reception conditions are relatively good).

Therefore, because the time adjustment process (time mode) or time difference adjustment process (positioning mode) is stopped if the satellite information cannot be acquired in a shorter time when the reception conditions are poor, the GPS wristwatch according to the first embodiment of the invention can prevent wasteful power consumption and can reduce the possibility of a system shutdown.

As shown in FIG. 10, when the number of captured GPS satellites 10 is greater than or equal to a set number (6), and the reception level of the satellite signals sent from the captured GPS satellites 10 is greater than a set value (−135 dBm) (when the reception conditions are quite good) in the positioning mode, the GPS wristwatch according to the first embodiment sets the satellite signal decoding time $T_d$ longer than when the number of captured GPS satellites 10 is less than the set number (6) or the reception level is less than the set value (−135 dBm) (when the reception conditions are relatively poor).

The GPS wristwatch according to the first embodiment of the invention can therefore increase the possibility of completing the time difference adjustment process (positioning mode) when the reception conditions are good.

2-2 Embodiment 2

The structure and circuit configuration of a GPS wristwatch according to this second embodiment of the invention are the same as the structure and circuit configuration of the GPS wristwatch according to the first embodiment of the invention shown in FIG. 3 to FIG. 5, and further description thereof is thus omitted.

In a GPS wristwatch according to this second embodiment of the invention, the GPS device 70 stops satellite signal reception if the combination of the number of GPS satellites 10 captured by the baseband unit 60 (satellite search component 60-2) and the reception level of the satellite signals transmitted from those GPS satellites 10 does not meet a specific condition.

The time adjustment process (time mode) and the time difference adjustment process (positioning mode) of the GPS wristwatch according to the second embodiment of the invention are the same as the processes of the GPS wristwatch 1 according to the first embodiment described in FIG. 6 and FIG. 8 except for the satellite signal decoding time setting steps (steps S24 and S64). The operation of the satellite signal decoding time setting process in the second embodiment is described below.

Figure 11:
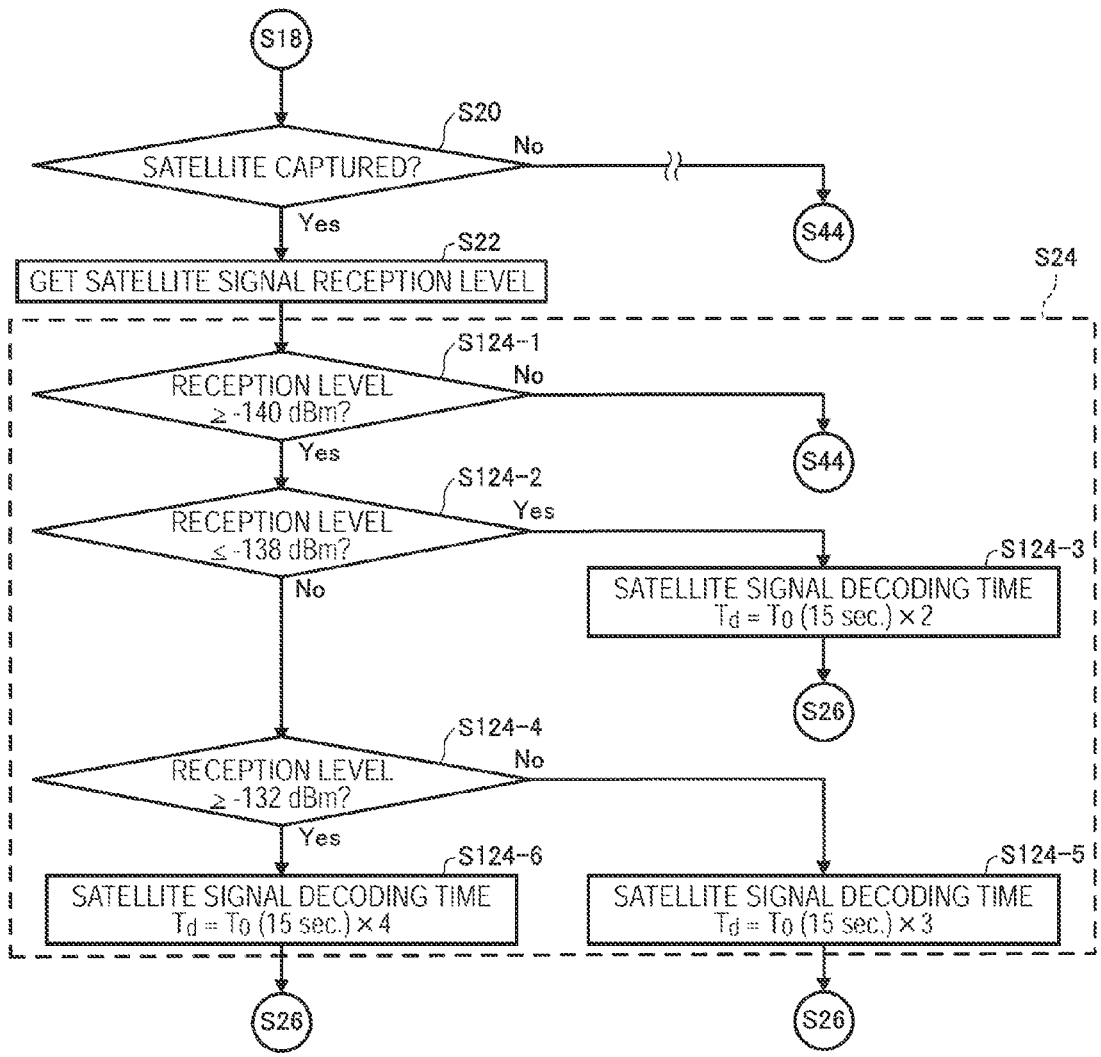
FIG. 11 is a flow chart describing an example of the satellite signal decoding time setting process in the time adjustment process according to a second embodiment of the invention.

FIG. 11 is a flow chart describing the operation of the satellite signal decoding time setting process (the process executed as step S24) in the time adjustment process (time mode) (which is identical to the process described in FIG. 6) of a GPS wristwatch according to the second embodiment of the invention.

In the satellite signal decoding time setting process shown in FIG. 11, if the reception level of the satellite signal from the GPS satellite 10 used to calculate the time is less than −140 dBm (step S124-1 returns No), the reception operation of the GPS device 70 ends unconditionally (step S44).

However, if the reception level of the satellite signal is greater than or equal to −140 dBm (step S124-1 returns Yes), the baseband unit 60 (time limit setting component 60-1) sets the variable satellite signal decoding time $T_d$ according to the reception level of the satellite signal.

More specifically, if the reception level of the satellite signal is greater than or equal to −140 dBm and is less than or equal to −138 dBm (step S124-1 returns Yes and step S124-2 returns Yes), the baseband unit 60 (time limit setting component 60-1) sets the satellite signal decoding time $T_d$ to $T_d=T_0$ (15 sec.)×2=30 seconds (step S124-3).

If the reception level of the satellite signal is greater than −138 dBm and less than −132 dBm (step S124-2 returns No, and step S124-4 returns No), the baseband unit 60 (time limit setting component 60-1) sets the satellite signal decoding time $T_d$ to $T_d=T_0$ (15 sec.)×3=45 seconds (step S124-5).

If the reception level of the satellite signal is greater than or equal to −132 dBm (step S124-4 returns Yes), the baseband unit 60 (time limit setting component 60-1) sets the satellite signal decoding time $T_d$ to $T_d=T_0$ (15 sec.)×4=60 seconds (step S124-6).

Figure 12:
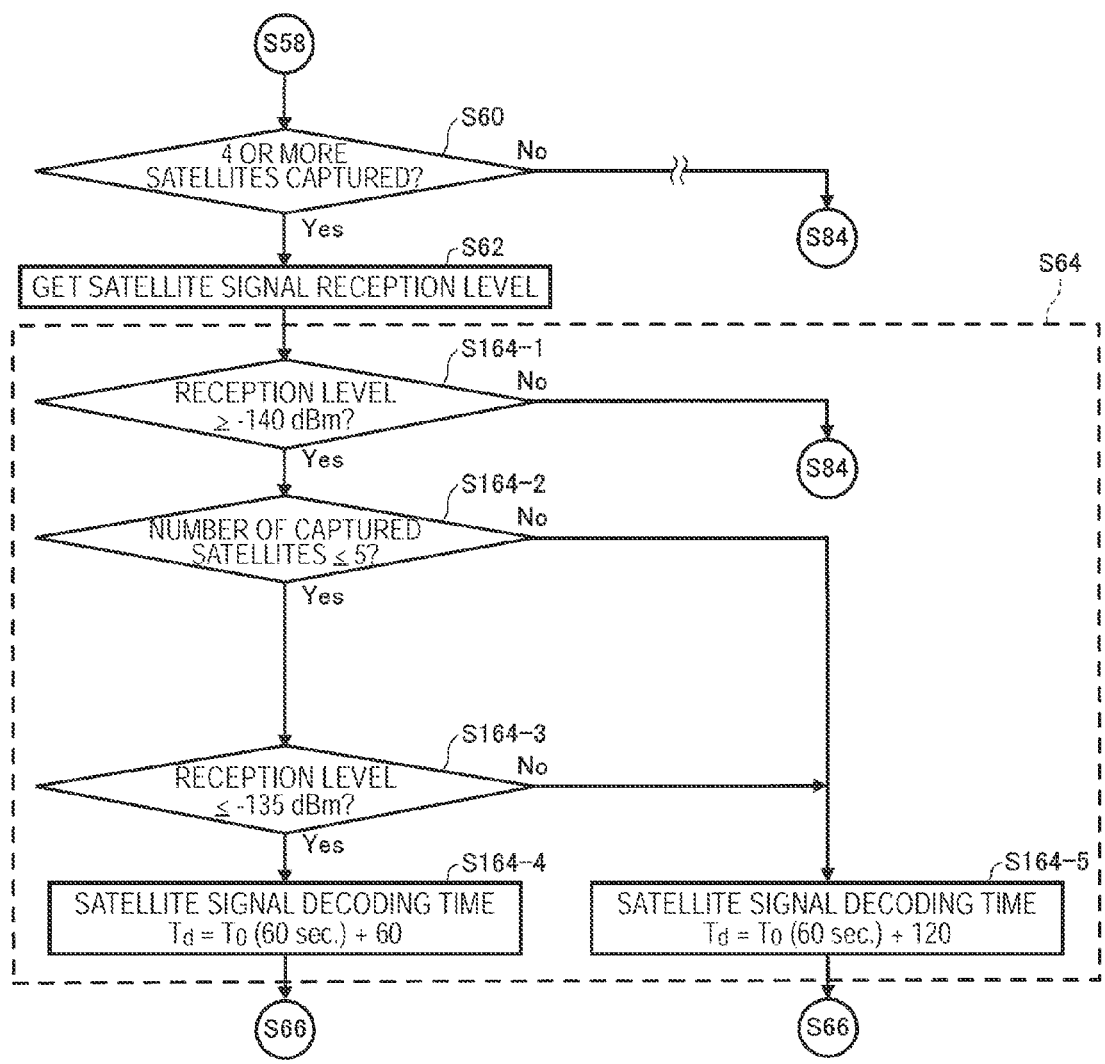
FIG. 12 is a flow chart describing an example of the satellite signal decoding time setting process in the time difference adjustment process according to a second embodiment of the invention.

FIG. 12 is a flow chart describing the operation of the satellite signal decoding time setting process (the process executed as step S64) in the time difference adjustment process (positioning mode) (which is identical to the process described in FIG. 8) of a GPS wristwatch according to the second embodiment of the invention.

In the satellite signal decoding time setting process shown in FIG. 11, if the minimum reception level of the satellite signals from the 4 GPS satellites 10 used for the positioning calculation is less than −140 dBm (step S164-1 returns No), the reception operation of the GPS device 70 ends unconditionally (step S84).

However, if the minimum reception level of the satellite signals from the 4 GPS satellites 10 used for the positioning calculation is greater than or equal to −140 dBm (step S164-1 returns Yes), the baseband unit 60 (time limit setting component 60-1) sets the variable satellite signal decoding time $T_d$ according to the number of captured GPS satellites 10 and the reception level of the satellite signals from the four GPS satellites 10 used to calculate the position.

More specifically, if the number of captured GPS satellites 10 is 5 or less (step S164-2 returns Yes), and the minimum reception level of the satellite signals from the 4 GPS satellites 10 used for the positioning calculation is less than or equal to −135 dBm (step S164-3 returns Yes), the baseband unit 60 (time limit setting component 60-1) sets the satellite signal decoding time $T_d$ to $T_d=T_0$ (60 sec.)+60 seconds=120 seconds (step S164-4).

If the number of captured GPS satellites 10 is more than 5 (step S164-2 returns No), or the minimum reception level of the satellite signals from the 4 GPS satellites 10 used for the positioning calculation is greater than −135 dBm (step S164-3 returns No), the baseband unit 60 (time limit setting component 60-1) sets the satellite signal decoding time $T_d$ to $T_d = T_0$ (60 sec.)+120 seconds=180 seconds (step S164-5).

Effect of Embodiment 2

In addition to the effect of the GPS wristwatch according to the first embodiment described above, the GPS wristwatch according to this second embodiment of the invention has the following effect.

As shown in FIG. 11, if the reception level of the satellite signals sent from the captured GPS satellites 10 does not meet a specific condition in the time mode (the reception level≧-140 dBm) (that is, when the reception conditions are relatively poor), the GPS wristwatch according to this second embodiment of the invention immediately stops satellite signal reception and stops the time adjustment process.

In the positioning mode as shown in FIG. 12, if the combination of the number of captured GPS satellites 10 and the reception level of the satellite signals transmitted from the captured GPS satellites 10 does not satisfy a specific condition (that is, the number of captured GPS satellites 10≧4, and the reception level≧-140 dBm) (that is, when the reception conditions are relatively poor), the GPS wristwatch according to this second embodiment of the invention immediately stops satellite signal reception and stops the time difference adjustment process.

As a result, the GPS wristwatch according to the second embodiment of the invention can prevent wasteful power consumption and can reduce the possibility of a system shutdown.

2-3 Embodiment 3

The structure of a GPS wristwatch according to this third embodiment of the invention is the same as the structure of the GPS wristwatch according to the first embodiment of the invention shown in FIG. 3, and further description thereof is thus omitted.

Figure 13:
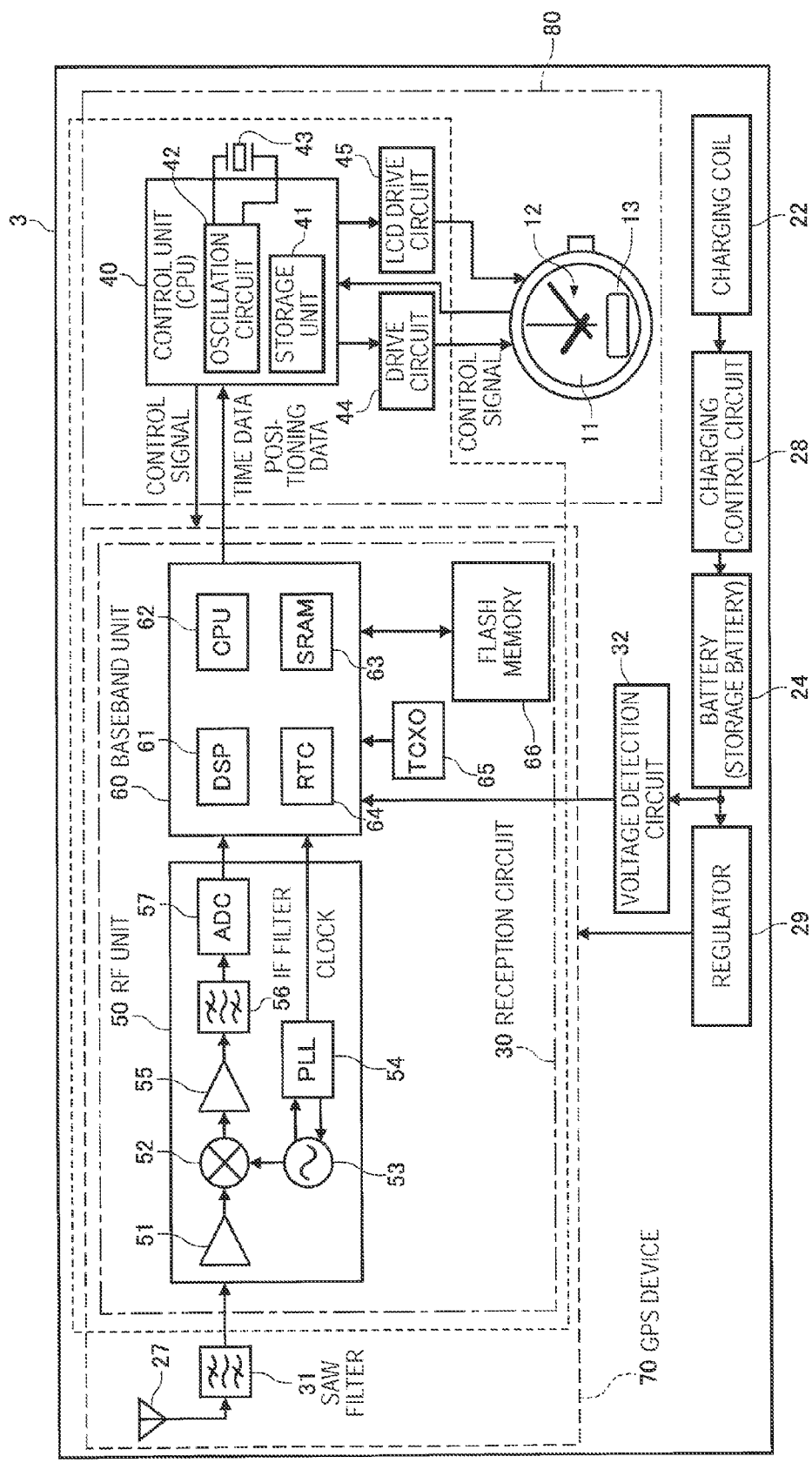
FIG. 13 describes the circuit configuration of a GPS wristwatch according to a third embodiment of the invention.

FIG. 13 describes the circuit configuration of a GPS wristwatch 3 according to a third embodiment of the invention.

Except for the addition of a voltage detection circuit 32, the circuit configuration of a GPS wristwatch 3 according to a third embodiment of the invention is the same as the circuit configuration of the GPS wristwatch according to the first embodiment shown in FIG. 4. Except for the voltage detection circuit 32, the parts are therefore identified by the same reference numerals used in FIG. 4, and further description thereof is omitted or simplified below.

The voltage detection circuit 32 executes a process of detecting the output voltage of the battery 24. For example, the voltage detection circuit 32 is connected parallel to the battery 24, and may be rendered by a series circuit including a resistor and a switch. In this configuration the voltage detection circuit 32 is controlled so that the switch is on when the voltage is detected, and is otherwise off.

In the time mode or positioning mode, the baseband unit 60 (time limit setting component 60-1) variably sets the satellite signal decoding time $T_d$ according to the output voltage of the battery 24 detected by the voltage detection circuit 32. For example, when the output voltage of the battery 24 is less than a specified value, the baseband unit 60 (time limit setting component 60-1) sets the satellite signal decoding time $T_d$ shorter than when the output voltage of the battery 24 is higher than the specified value.

Note that a common lithium-ion storage battery can be used as the battery 24.

The time adjustment process (time mode) and the time difference adjustment process (positioning mode) in this third embodiment of the invention are described next.

Figure 14:
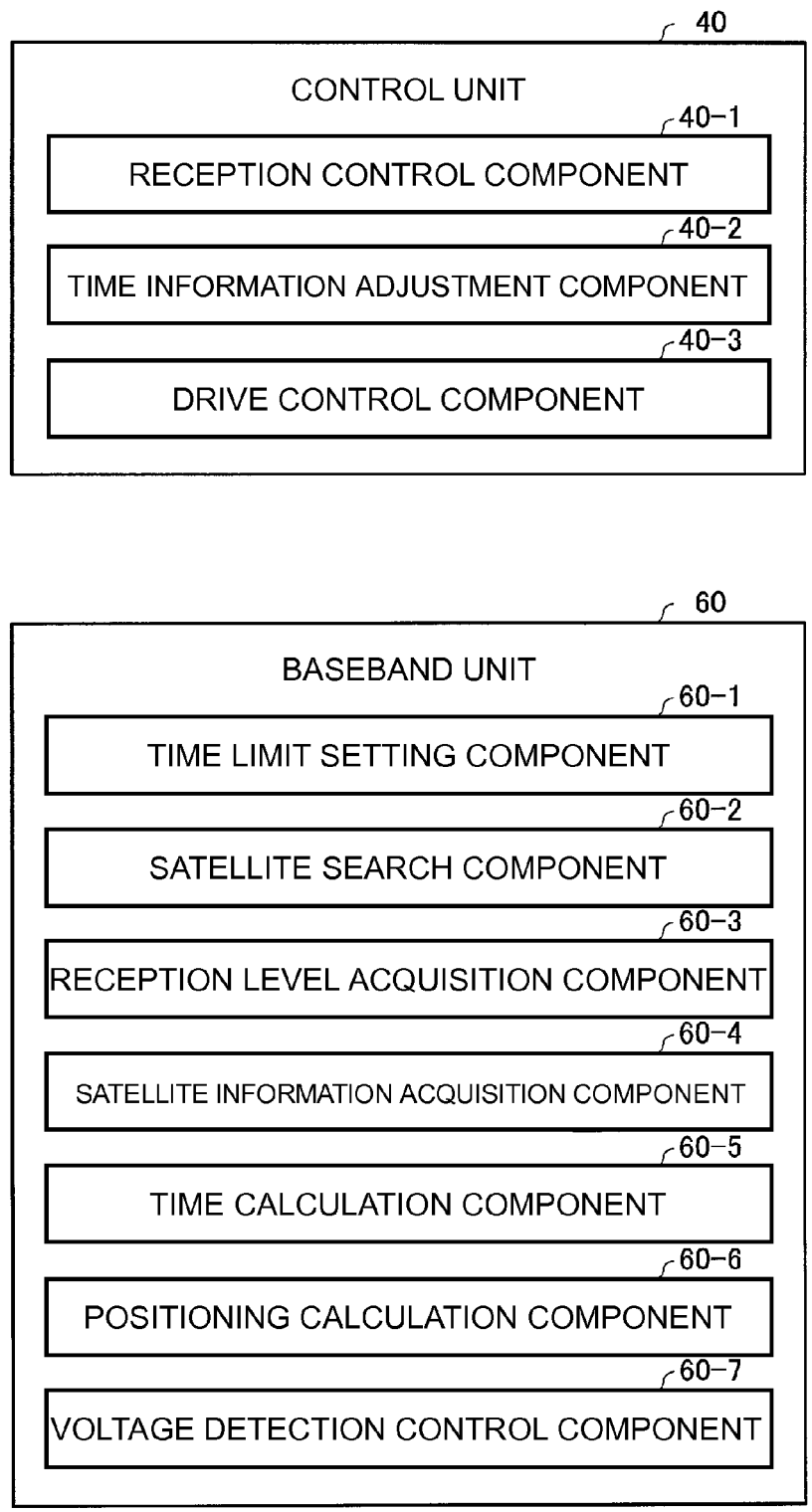
FIG. 14 describes the configuration of the control unit in the third embodiment of the invention.

As shown in FIG. 14, the time adjustment process (time mode) and the time difference adjustment process (positioning mode) can be executed by the control unit 40 functioning as a reception control component 40-1, time information adjustment component 40-2, and drive control component 40-3, and the baseband unit 60 functioning as a time limit setting component 60-1, satellite search component 60-2, reception level acquisition component 60-3, satellite information acquisition component 60-4, time calculation component 60-5, positioning calculation component 60-6, and voltage detection control component 60-7.

Note that the function rendered by the control unit 40 of the third embodiment is the same function rendered by the control unit 40 of the first embodiment shown in FIG. 5. In addition, except for the voltage detection control component 60-7, the function rendered by the baseband unit 60 of the third embodiment is the same function rendered by the baseband unit 60 of the first embodiment shown in FIG. 5.

Figure 15:
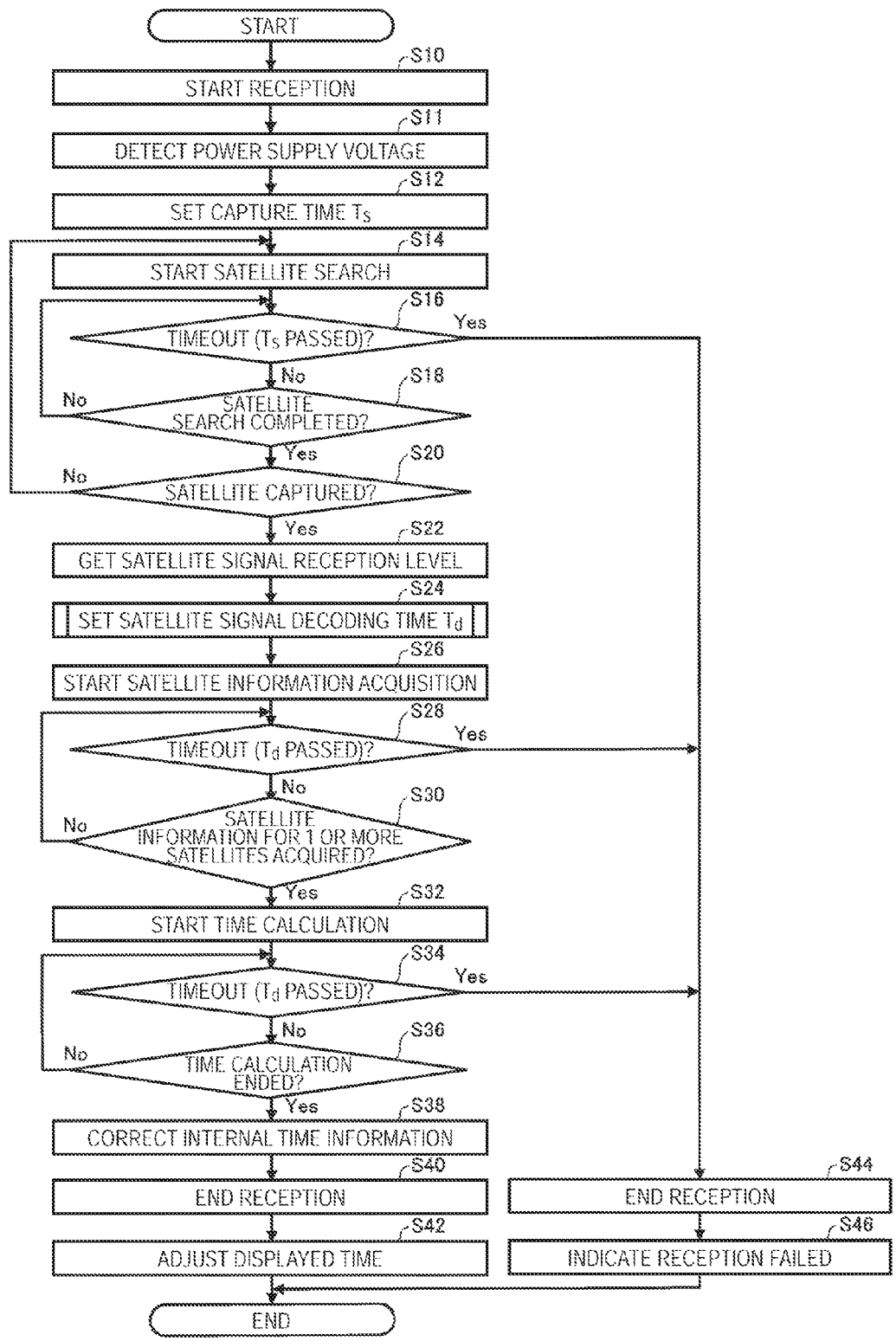
FIG. 15 is a flow chart showing an example of the time adjustment process in the third embodiment of the invention.

FIG. 15 is a flow chart describing the time adjustment process (time mode) of a GPS wristwatch according to a third embodiment of the invention.

Except for processes executed in steps S11 and S24, the operation of the time adjustment process (time mode) shown in FIG. 15 is the same as the time adjustment process (time mode) of the first embodiment shown in FIG. 6. Therefore, except for steps S11 and S24, the description of steps S10 to S46 is omitted below.

The GPS wristwatch according to the third embodiment of the invention executes the time adjustment process (time mode) shown in FIG. 15 when the time mode is set.

When the time adjustment process (time mode) starts (step S10), the baseband unit 60 (voltage detection control component 60-7) causes the voltage detection circuit 32 to detect the output voltage of the battery 24 (step S11). If the voltage detection circuit 32 is configured as described above, for example, the baseband unit 60 (voltage detection control component 60-7) turns the switch from off to on. After storing the detected voltage in SRAM 63, the baseband unit 60 (voltage detection control component 60-7) then turns the switch off.

Operation then continues from step S12, and in the satellite signal decoding time setting process in step S24 the baseband unit 60 (time limit setting component 60-1) sets the satellite signal decoding time $T_d$ based on the detected voltage stored in SRAM 63.

Operation then continues from step S26, and the time adjustment process (time mode) ends.

Figure 16:
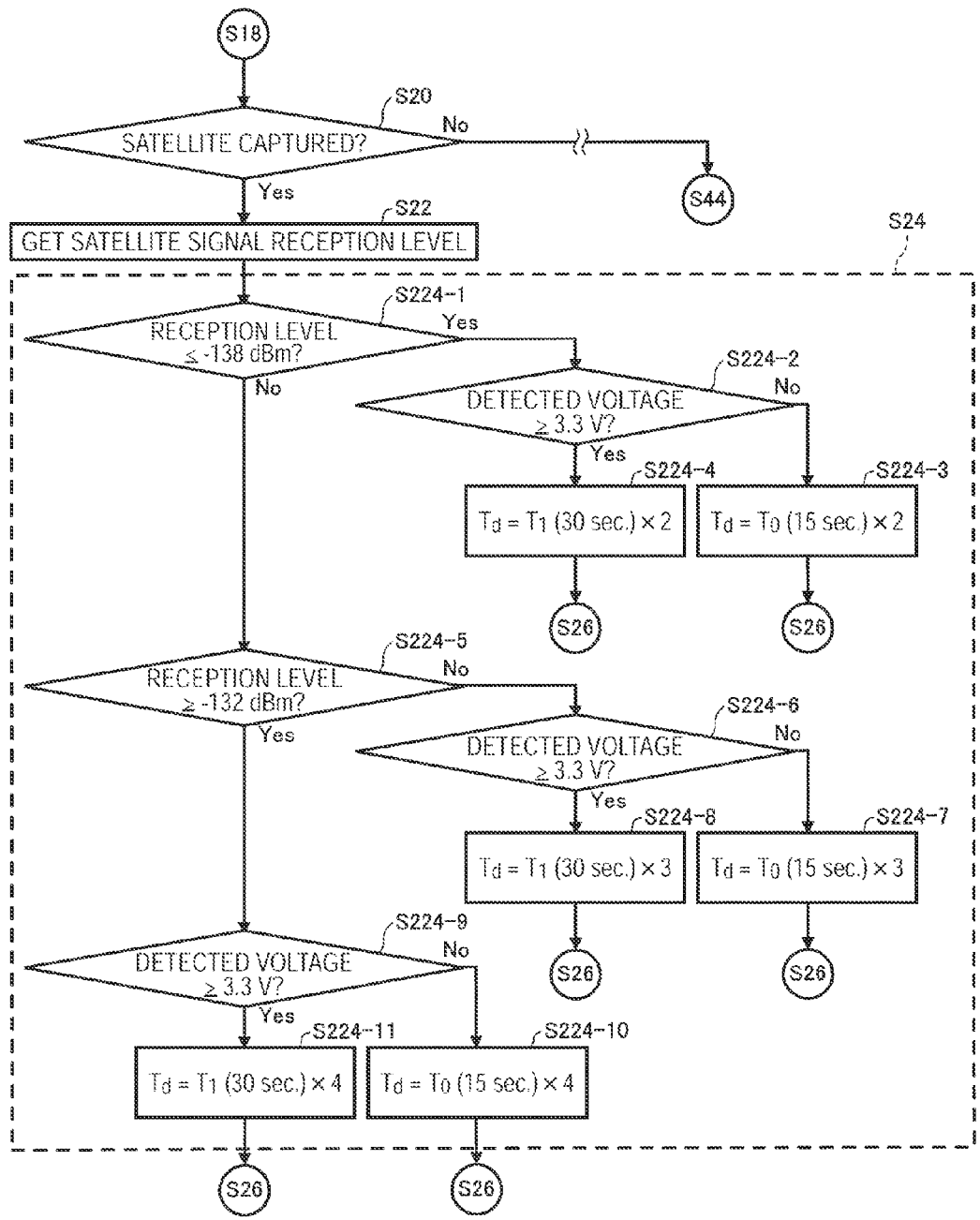
FIG. 16 is a flow chart describing an example of the satellite signal decoding time setting process in the time adjustment process according to the third embodiment of the invention.

FIG. 16 is a flow chart showing an example of the satellite signal decoding time setting process (step S24) executed in the time adjustment process (time mode) of a GPS wristwatch according to the third embodiment of the invention.

In the satellite signal decoding time setting process shown in FIG. 16, the baseband unit 60 (time limit setting component 60-1) sets the variable satellite signal decoding time $T_d$ according to the reception level of the satellite signal from the GPS satellite 10 used to calculate the time and the detected voltage of the battery 24.

More specifically, if the reception level of the satellite signal from the GPS satellite 10 used to calculate the time is less than or equal to -138 dBm (step S224-1 returns Yes), and if the detected voltage of the battery 24 is less than 3.3 V (step S224-2 returns No), the baseband unit 60 (time limit setting component 60-1) sets the satellite signal decoding time $T_d$ to $T_d = T_0$ (15 sec.)×2=30 seconds (step S224-3). However, if the detected voltage of the battery 24 is greater than or equal to 3.3 V (step S224-2 returns Yes), the baseband unit 60 (time limit setting component 60-1) sets the satellite signal decoding time $T_d$ to $T_d=T_1$ (30 sec.)×2=60 seconds (step S224-4).

If the reception level of the satellite signal is greater than −138 dBm and less than −132 dBm (step S224-1 returns No and step S224-5 returns No), and if the detected voltage of the battery 24 is less than 3.3 V (step S224-6 returns No), the baseband unit 60 (time limit setting component 60-1) sets the satellite signal decoding time $T_d$ to $T_d=T_0$ (15 sec.)×3=45 seconds (step S224-7). However, if the detected voltage of the battery 24 is greater than or equal to 3.3 V (step S224-6 returns Yes), the baseband unit 60 (time limit setting component 60-1) sets the satellite signal decoding time $T_d$ to $T_d=T_1$ (30 sec.)×3=90 seconds (step S224-8).

Furthermore, if the reception level of the satellite signal is greater than or equal to −132 dBm (step S224-5 returns Yes), and if the detected voltage of the battery 24 is less than 3.3 V (step S224-9 returns No), the baseband unit 60 (time limit setting component 60-1) sets the satellite signal decoding time $T_d$ to $T_d=T_0$ (15 sec.)×4=60 seconds (step S224-10). However, if the detected voltage of the battery 24 is greater than or equal to 3.3 V (step S224-9 returns Yes), the baseband unit 60 (time limit setting component 60-1) sets the satellite signal decoding time $T_d$ to $T_d=T_1$ (30 sec.)×4=120 seconds (step S224-11).

Figure 17:
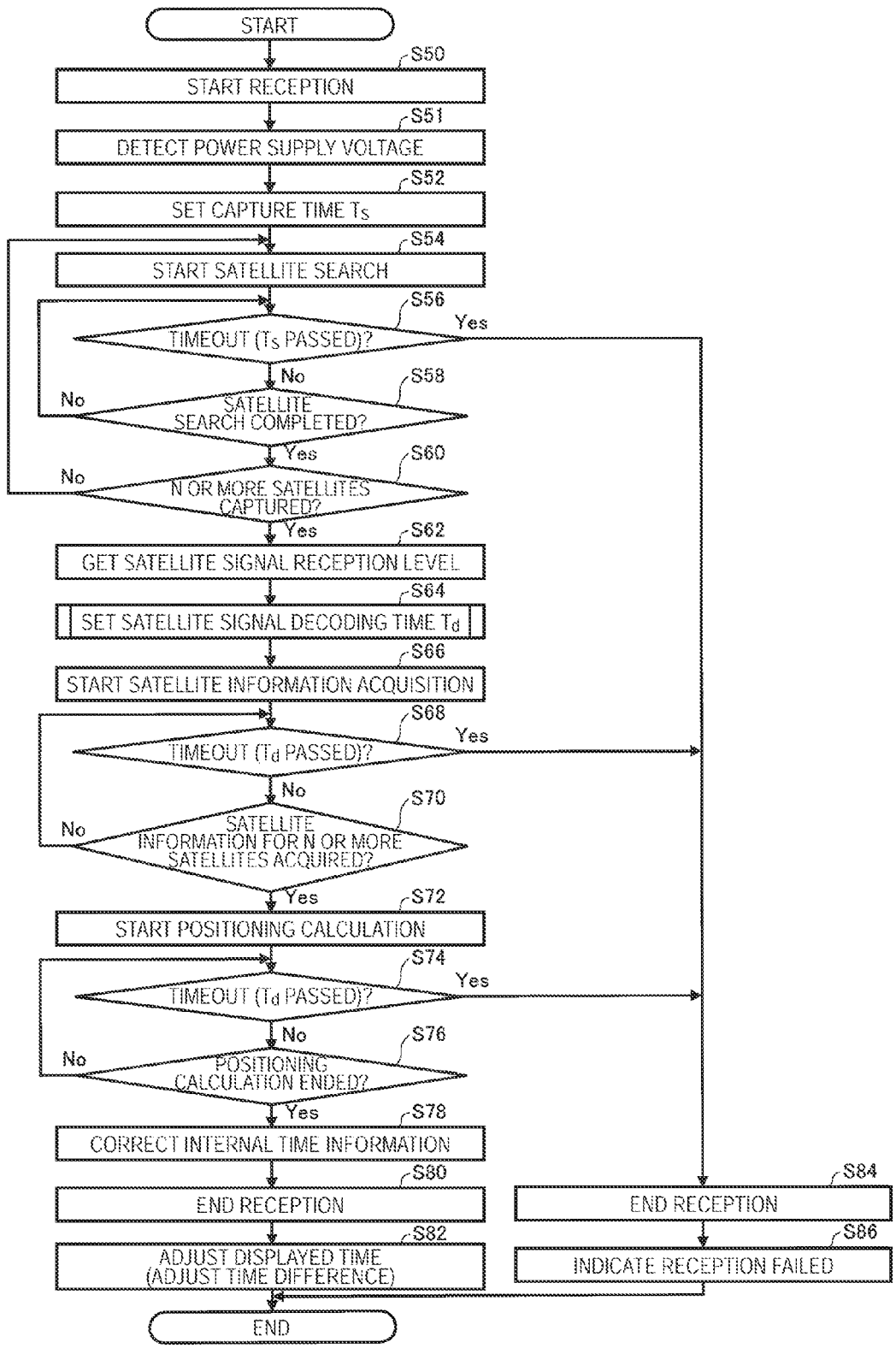
FIG. 17 is a flow chart describing an example of the time difference adjustment process in the third embodiment of the invention.

FIG. 17 is a flow chart describing the time difference adjustment process (positioning mode) of the GPS wristwatch according to a third embodiment of the invention.

Except for processes executed in steps S51 and S64, the operation of the time difference adjustment process (positioning mode) shown in FIG. 17 is the same as the time difference adjustment process (positioning mode) of the first embodiment shown in FIG. 8. Therefore, except for steps S51 and S64, the description of steps S50 to S86 is omitted below.

The GPS wristwatch according to the third embodiment of the invention executes the time difference adjustment process (positioning mode) shown in FIG. 17 when the positioning mode is set.

As in the time adjustment process (time mode) described in FIG. 15, when reception starts (step S50), the baseband unit 60 (voltage detection control component 60-7) causes the voltage detection circuit 32 to detect the output voltage of the battery 24 (step S51). The baseband unit 60 (voltage detection control component 60-7) then stores the detected voltage in SRAM 63.

Operation then continues from step S52, and in the satellite signal decoding time setting process in step S64 the baseband unit 60 (time limit setting component 60-1) sets the satellite signal decoding time $T_d$ based on the detected voltage stored in SRAM 63.

Operation then continues from step S66, and the time difference adjustment process (positioning mode) ends.

Figure 18:
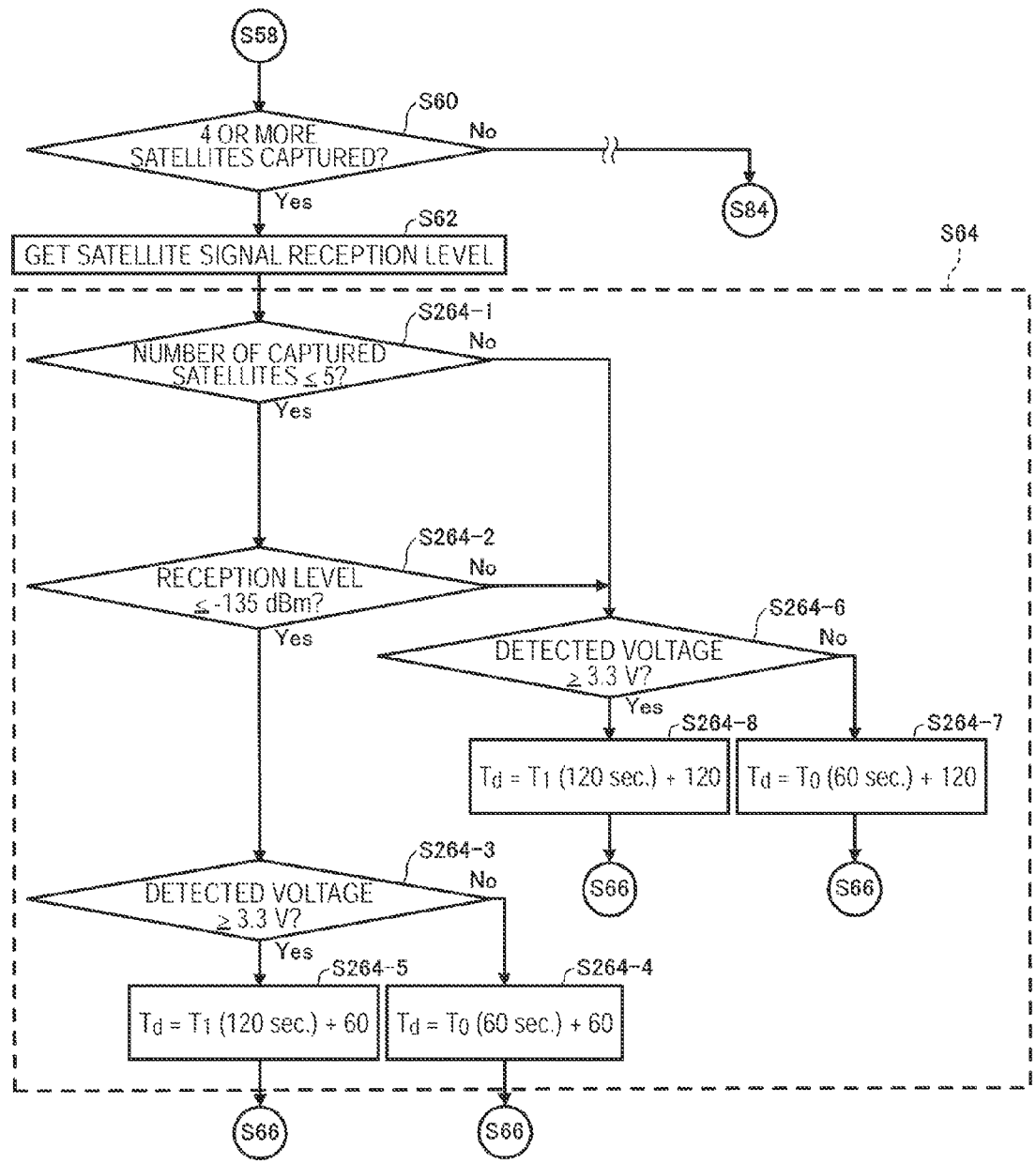
FIG. 18 is a flow chart describing an example of the satellite signal decoding time setting process in the time difference adjustment process according to the third embodiment of the invention.

FIG. 18 is a flow chart showing an example of the satellite signal decoding time setting process (step S64) in the time difference adjustment process (positioning mode) of the GPS wristwatch according to the third embodiment of the invention.

In the satellite signal decoding time setting process shown in FIG. 18, the baseband unit 60 (time limit setting component 60-1) sets the variable satellite signal decoding time $T_d$ according to the number of GPS satellites 10 captured, the reception levels of the satellite signals from the 4 GPS satellites 10 that are used to calculate the position, and the detected voltage of the battery 24.

More specifically, if the number of captured GPS satellites 10 is 5 or less (step S264-1 returns Yes) and the minimum reception level of the satellite signals from the 4 GPS satellites 10 used for the positioning calculation is less than or equal to −135 dBm (step S264-2 returns Yes), and if the detected voltage of the battery 24 is less than 3.3 V (step S264-3 returns No), the baseband unit 60 (time limit setting component 60-1) sets the satellite signal decoding time $T_d$ to $T_d=T_0$ (60 sec.)+60 seconds=120 seconds (step S264-4).

However, if the detected voltage of the battery 24 is greater than or equal to 3.3 V (step S264-3 returns Yes), the baseband unit 60 (time limit setting component 60-1) sets the satellite signal decoding time $T_d$ to $T_d=T_1$ (120 sec.)+60 seconds=180 seconds (step S264-5).

If the number of captured GPS satellites 10 is more than 5 (step S264-1 returns No), or the minimum reception level of the satellite signals from the 4 GPS satellites 10 used for the positioning calculation is greater than −135 dBm (step S264-2 returns No), the baseband unit 60 (time limit setting component 60-1) sets the satellite signal decoding time $T_d$ to $T_d=T_0$ (60 sec.)+120 seconds=180 seconds (step S264-7) if the detected voltage of the battery 24 is less than 3.3 V (step S264-6 returns No).

However, if the detected voltage of the battery 24 is greater than or equal to 3.3 V (step S264-6 returns Yes), the baseband unit 60 (time limit setting component 60-1) sets the satellite signal decoding time $T_d$ to $T_d=T_1$ (120 sec.)+120 seconds=240 seconds (step S264-8).

Effect of Embodiment 3

In addition to the effects of the GPS wristwatch according to the first embodiment, a GPS wristwatch according to this third embodiment of the invention has the following effect.

As shown in FIG. 13 to FIG. 18, a GPS wristwatch according to this third embodiment of the invention sets the satellite signal decoding time $T_d$ variably based on the output voltage of the battery 24. The GPS wristwatch according to the third embodiment of the invention can therefore optimize power consumption according to the remaining battery capacity.

As shown in FIG. 16 and FIG. 18, the GPS wristwatch according to the third embodiment of the invention sets the satellite signal decoding time $T_d$ to a shorter time when the detected voltage of the battery 24 is less than a specific level (3.3 V) than when the output voltage of the battery 24 is greater than the specific level (3.3 V). Therefore, because the GPS wristwatch according to the third embodiment of the invention stops the time adjustment process (time mode) or time difference adjustment process (positioning mode) if the satellite information cannot be acquired in a shorter time when the remaining battery capacity is low, consuming power needlessly can be prevented and the possibility of a system shutdown can be reduced.

2-4 Embodiment 4

The structure of a GPS wristwatch according to this fourth embodiment of the invention is the same as the structure of the GPS wristwatch according to the first embodiment of the invention shown in FIG. 3, and further description thereof is thus omitted.

The circuit configuration of the GPS wristwatch according to this fourth embodiment of the invention is the same as the configuration of the GPS wristwatch according to the third embodiment of the invention shown in FIG. 13 and FIG. 14, and further description thereof is thus omitted.

In the GPS wristwatch according to the fourth embodiment of the invention, the baseband unit 60 (time limit setting component 60-1) variably sets the capture time $T_s$ according to the output voltage of the battery 24 detected by the voltage detection circuit 32. For example, when the output voltage of the battery 24 is less than a specified value, the baseband unit 60 (time limit setting component 60-1) sets the capture time $T_s$ shorter than when the output voltage of the battery 24 is higher than the specified value.

Except for the capture time setting process (the process executed in steps S12 and S52), the time adjustment process (time mode) and the time difference adjustment process (positioning mode) of the GPS wristwatch according to the fourth embodiment are the same as the processes executed by the GPS wristwatch according to the third embodiment shown in FIG. 15 and FIG. 17. The capture time setting process in this fourth embodiment is described below.

Figure 19:
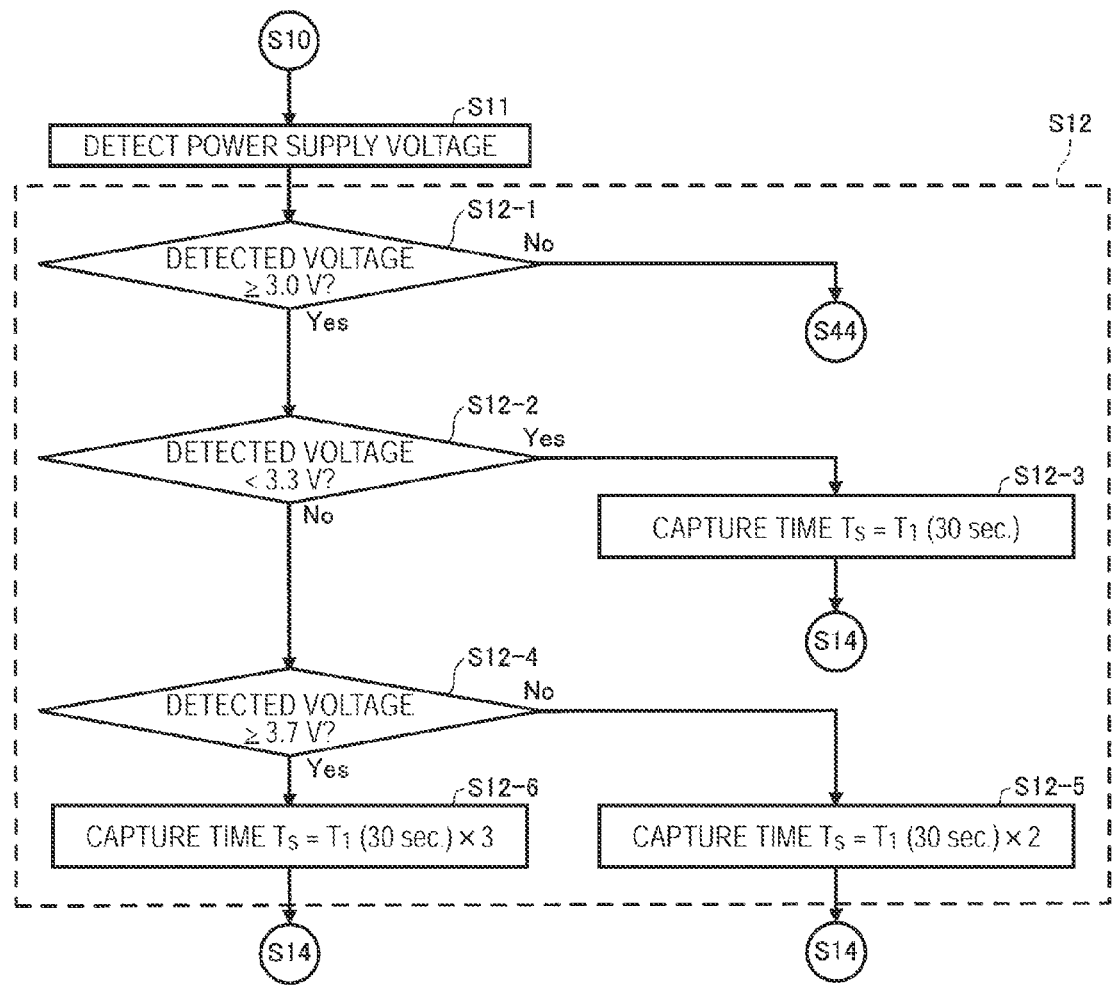
FIG. 19 is a flow chart describing an example of a capture time setting process in a fourth embodiment of the invention.

FIG. 19 is a flow chart showing an example of the capture time setting process (the process executed in step S12) in the time adjustment process (time mode) (identical to the process shown in FIG. 15) of the GPS wristwatch according to the fourth embodiment of the invention.

In the capture time setting process shown in FIG. 19, if the detected voltage of the battery 24 is less than 3.3 V (step S12-1 returns No), the reception operation of the GPS device 70 ends unconditionally (step S44).

However, if the detected voltage of the battery 24 is greater than or equal to 3.3 V (step S12-1 returns Yes), the baseband unit 60 (time limit setting component 60-1) variably sets the capture time $T_s$ according to the detected voltage of the battery 24.

More specifically, if the detected voltage of the battery 24 is greater than or equal to 3.0 V and is less than 3.3 V (step S12-1 returns Yes and step S12-2 returns Yes), the baseband unit 60 (time limit setting component 60-1) sets the capture time $T_s$ to $T_s = T_1$ (30 sec.) (step S12-3).

If the detected voltage of the battery 24 is greater than or equal to 3.3 V and is less than 3.7 V (step S12-2 returns No and step S12-4 returns No), the baseband unit 60 (time limit setting component 60-1) sets the capture time $T_s$ to $T_s = T_1$ (30 sec.)$\times 2 = 60$ sec. (step S12-5).

If the detected voltage of the battery 24 is greater than or equal to 3.7 V (step S12-4 returns Yes), the baseband unit 60 (time limit setting component 60-1) sets the capture time $T_s$ to $T_s = T_1$ (30 sec.)$\times 3 = 90$ sec. (step S12-6).

Note that the capture time setting process (the process executed in step S52) in the time difference adjustment process (positioning mode) (identical to the process shown in FIG. 17) of the GPS wristwatch according to the fourth embodiment of the invention is identical to the capture time setting process shown in FIG. 19, and further description thereof is thus omitted.

Effect of Embodiment 4

In addition to the effects of the GPS wristwatch according to the first embodiment, a GPS wristwatch according to this third embodiment of the invention has the following effect.

As shown in FIG. 19, a GPS wristwatch according to this fourth embodiment of the invention sets the capture time $T_s$ variably based on the output voltage of the battery 24. The GPS wristwatch according to the fourth embodiment of the invention can therefore optimize power consumption according to the remaining battery capacity.

As shown in FIG. 19, the GPS wristwatch according to the fourth embodiment of the invention sets the capture time $T_s$ to a shorter time when the output voltage of the battery 24 is less than a specific level (3.3 V) than when the output voltage of the battery 24 is greater than the specific level (3.3 V). Therefore, because the GPS wristwatch according to the fourth embodiment of the invention stops the time adjustment process (time mode) or time difference adjustment process (positioning mode) if the required number of GPS satellites 10 cannot be captured in a shorter time when the remaining battery power is low, consuming power needlessly can be prevented and the possibility of a system shutdown can be reduced.

It will be obvious to one with ordinary skill in the related art that the invention is not limited to the embodiments described above and can be varied in many ways without departing from the scope of the accompanying claims.

The invention includes configurations that are effectively the same as the configurations of the preferred embodiments described above, including configurations with the same function, method, and effect, and configurations with the same object and effect. The invention also includes configurations that replace parts that are not fundamental to the configurations of the preferred embodiments described above. The invention also includes configurations achieving the same operational effect as the configurations of the preferred embodiments described above, as well as configurations that can achieve the same object. The invention also includes configurations that add technology known from the literature to the configurations of the preferred embodiments described above.

What is claimed is:

1. An electronic timepiece having a function for receiving satellite signals transmitted from positioning information satellites, comprising:

a satellite signal reception unit that receives satellite signal(s);

a satellite capturing unit that executes a process of capturing at least one of the positioning information satellites within a predetermined capture time;

a time adjustment information generating unit that acquires satellite information from the satellite signal(s) transmitted from one or more of the positioning information satellites captured by the satellite capturing unit, and generates time adjustment information based on the satellite information;

a time information adjustment unit that adjusts internal time information based on the time adjustment information;

a time information display unit that displays the internal time information; and a time limit setting unit that variably sets a time limit for the time adjustment information generating unit to generate the time adjustment information based on a reception level of the satellite signal(s) transmitted from one or more of the positioning information satellites:

wherein the satellite capturing unit stops reception of the satellite signal(s) if none of the positioning information satellites is captured within the predetermined capture time;

wherein the time limit, setting unit sets the time limit shorter when the reception level of the satellite signal(s) transmitted from one or more of the positioning information satellites captured by the satellite capturing unit is less than a specific value than when the reception level is higher than the specific value.

2. The electronic timepiece described in claim 1, wherein:

the time adjustment information generating unit includes a first operation mode in which the time adjustment information is generated based on satellite time information contained in the satellite information, and a second operation mode in which a position of the electronic timepiece is calculated based on the satellite time information and orbit information contained in the satellite information and the time adjustment information is generated based on the calculated position.

3. The electronic timepiece described in claim 2, wherein:

in the first operation mode, one of the positioning information satellites is captured and the satellite information obtained, and in the second operation mode, at least four of the positioning information satellites are captured and a plurality of satellite information obtained.

4. The electronic timepiece described in claim 2, further comprising:
a memory that stores time difference information that defines time difference data associated with a position, wherein, in the second operation mode, the time difference information is referenced to obtain time difference data associated with the calculated position, and the time adjustment information is generated using the time difference data.

5. The electronic timepiece described in claim 3, further comprising:
a memory that stores time difference information that defines time difference data associated with a position, wherein, in the second operation mode, the time difference information is referenced to obtain time difference data associated with the calculated position, and the time adjustment information is generated using the time difference data.

6. The electronic timepiece described in claim 1, wherein:
the predetermined capture time is six seconds.

7. The electronic timepiece as described in claim 1, wherein:
the electronic timepiece comprises an electronic watch.

* * * * *